US012680057B2

(12) United States Patent
Williams et al.

(10) Patent No.: US 12,680,057 B2
(45) Date of Patent: *Jul. 14, 2026

(54) FABRIC CARE COMPOSITION

(71) Applicant: The Procter & Gamble Company, Cincinnati, OH (US)

(72) Inventors: Kristin Rhedrick Williams, West Chester, OH (US); Jaden Scott Zerhusen, Florence, KY (US); Amanee Daarina Salaam, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 209 days.

This patent is subject to a terminal disclaimer.

(21) Appl. No.: 18/422,286

(22) Filed: Jan. 25, 2024

(65) Prior Publication Data

US 2024/0166975 A1 May 23, 2024

Related U.S. Application Data

(63) Continuation of application No. 17/321,008, filed on May 14, 2021, now Pat. No. 11,920,111.

(30) Foreign Application Priority Data

May 14, 2020 (EP) .................................... 20174561

(51) Int. Cl.
*C11D 3/22* (2006.01)
*B08B 3/04* (2006.01)
(Continued)

(52) U.S. Cl.
CPC ............ *C11D 3/505* (2013.01); *C11D 3/2065* (2013.01); *C11D 3/222* (2013.01);
(Continued)

(58) Field of Classification Search
CPC ......... C11D 3/2065; C11D 3/22; C11D 3/222; C11D 3/50; C11D 17/0034; C11D 17/06; B08B 3/04
See application file for complete search history.

(56) References Cited

U.S. PATENT DOCUMENTS 5,246,603 A 9/1993 Tsaur et al.
6,927,195 B2 8/2005 Birch et al.
(Continued)

FOREIGN PATENT DOCUMENTS

CH 702771 B1 9/2011
CN 1761401 A 4/2006
(Continued)

OTHER PUBLICATIONS

PCT Search Report and Written Opinion for PCT/US2021/032373 dated Aug. 2, 2021, 10 pages.
(Continued)

*Primary Examiner* — Brian P Mruk
(74) *Attorney, Agent, or Firm* — Carolyn S. Powell; Gary J. Foose

(57) ABSTRACT

A fabric care composition including a plurality of particles, wherein each of the particles include a fabric care agent, water, a sugar alcohol polyol, and a modified starch. The modified starch can have a dextrose equivalent from 4 to 20. The fabric care active agent, said water, and said sugar alcohol polyol are dispersed in the modified starch.

15 Claims, 3 Drawing Sheets

(51) Int. Cl.

| | |
|---|---|
| ***C11D 3/20*** | (2006.01) |
| ***C11D 3/50*** | (2006.01) |
| ***C11D 17/00*** | (2006.01) |
| ***C11D 17/06*** | (2006.01) |
| *C11D 3/37* | (2006.01) |

(52) U.S. Cl.

CPC ........ *C11D 17/0034* (2013.01); *C11D 3/2068* (2013.01); *C11D 3/3707* (2013.01)

(56) References Cited

U.S. PATENT DOCUMENTS

| | | | | |
|---|---|---|---|---|
| 6,932,982 | B2 | 8/2005 | Mciver et al. | |
| 8,399,395 | B2 | 3/2013 | Dreja et al. | |
| 11,920,111 | B2 * | 3/2024 | Williams ............... | C11D 3/505 |
| 2005/0152932 | A1 | 7/2005 | Normand et al. | |
| 2009/0157034 | A1 | 6/2009 | Mattingly et al. | |
| 2011/0082066 | A1 | 4/2011 | Wrubbel et al. | |
| 2011/0097369 | A1 | 4/2011 | Sunder | |
| 2011/0224127 | A1 * | 9/2011 | Blyth ..................... | C11D 3/505 264/4.6 |
| 2014/0127361 | A1 | 5/2014 | Gregson et al. | |
| 2015/0218492 | A1 | 8/2015 | Dale et al. | |
| 2017/0296399 | A1 | 10/2017 | Kline et al. | |
| 2017/0313034 | A1 | 11/2017 | Takeda et al. | |
| 2017/0319399 | A1 | 11/2017 | Desai et al. | |
| 2017/0333261 | A1 | 11/2017 | Chatterjee | |
| 2018/0169964 | A1 | 6/2018 | Schneider | |
| 2019/0070042 | A1 | 3/2019 | Beck | |
| 2021/0355415 | A1 | 11/2021 | Williams et al. | |

FOREIGN PATENT DOCUMENTS

| | | | | | |
|---|---|---|---|---|---|
| CN | 101005771 | A | | 7/2007 | |
| CN | 102361966 | A | | 2/2012 | |
| CN | 103648302 | A | | 3/2014 | |
| CN | 108384300 | A | | 8/2018 | |
| DE | 102006034051 | A1 | | 1/2008 | |
| DE | 102008031212 | A1 | | 1/2010 | |
| DE | 102009029292 | A1 | | 3/2011 | |
| DE | 102017007096 | A1 | | 1/2019 | |
| EP | 1627573 | A1 | | 2/2006 | |
| JP | 2000297293 | A | | 10/2000 | |
| WO | 0025606 | A1 | | 5/2000 | |
| WO | 02065858 | A1 | | 8/2002 | |
| WO | 2018055114 | A1 | | 3/2018 | |
| WO | WO 2018/055114 | | * | 3/2018 | ............... C11D 3/20 |

OTHER PUBLICATIONS

All Office Actions; U.S. Appl. No. 17/321,008, filed on May 14, 2021.

EPO Search Report and Opinion for. 20174561.9, dated Nov. 3, 2020, 8 pages.

* cited by examiner

FABRIC CARE COMPOSITION

This application is a continuation of Ser. No. 17/321,008, filed May 14, 2021, now U.S. U.S. Pat. No. 11,920,111.

FIELD OF THE INVENTION

Fabric care compositions.

BACKGROUND OF THE INVENTION

Consumers desire products that can simplify the processes they use to do their laundry, help them reduce the amount of time that they spend dealing with soiled laundry, and help them achieve high levels of benefits. Consumers are well positioned to understand the amount of fabric care composition that is required to provide benefit they desire. As a result, fabric care products that enable consumers to customize the amount of fabric care composition they use are popular with many consumers.

Fabric care products that can be delivered in the wash are particularly easy for consumers to use. For instance, the consumer can simply place the fabric care product in the tub of the washing machine along with the laundry and start the washing machine cycle.

Typically, consumers use a fabric care detergent composition that contains an appreciable quantity of surfactants and other cleaning ingredients. Such fabric care compositions are often provided in soluble unit dose pouches that contain a prescribed quantity of fabric care active agents. Fabric care compositions are also provided in liquid or powder forms and the consumer is provided with a measuring cup to provide a measured quantity of fabric care composition. These types of products may be referred to as fully formulated fabric care compositions.

To provide for fabric care benefits above and beyond what can be provided by using fully formulated fabric care compositions, fabric care products that are additives are popular with consumers. Consumers enjoy and are satisfied by using fabric care additives that are packaged in a manner the enables the consumer to use a custom amount of the fabric care additive based on the consumer's judgment of how much of the fabric care additive is needed to provide the desired benefit. Such fabric care additives are conveniently provided through the wash along with fully formulated fabric care compositions but are dosed separately from the fully formulated fabric care composition.

Many consumers also desire to use naturally sourced fabric care products or fabric care products that contain a large fraction of or are entirely made up of naturally sourced ingredients. With this consumer need in mind, there is a continuing unaddressed need for fabric care additives that are naturally sourced or include a large fraction of naturally sourced ingredients.

SUMMARY OF THE INVENTION

A fabric care composition comprising a plurality of particles, wherein the particles comprise: a fabric care active agent selected from the group consisting of perfume, fabric softener active, cationic polymer, dye transfer inhibitor, malodor control agent, and mixtures thereof; from 0% to 3% by weight plasticizer polyol that is liquid at 20 C and 1 atmosphere of pressure; from 1% to about 20% by weight water; from about 45% to about 80% by weight sugar alcohol polyol selected from the group consisting of or selected from or selected from at least one of erythritol, xylitol, mannitol, isomalt, maltitol, lactitol, trehalose, lactose, tagatose, sucralose, and mixtures thereof; modified starch having a dextrose equivalent from 4 to 20, wherein the sugar alcohol polyol and the modified starch are present at a weight ratio of the sugar alcohol polyol to the modified starch from 2:1 to 16:1 if the modified starch has a dextrose equivalent from 15 to 20 and wherein the sugar alcohol polyol and the modified starch are present at a weight ratio of the sugar alcohol polyol to the modified starch from 1.5:1 to 16:1 if the modified starch has a dextrose equivalent from 4 to less than 15; wherein the fabric care active agent, the water, and the sugar alcohol polyol are dispersed in the modified starch.

A fabric care composition comprising a plurality of particles, wherein the particles comprise: a fabric care active agent selected from the group consisting of or selected from or selected from at least one of perfume, fabric softener active, cationic polymer, malodor control agent, and mixtures thereof; from 0% to 3% by weight plasticizer polyol that is liquid at 20 C and 1 atmosphere of pressure; from 1% to about 10% by weight water; from about 15% to about 40% by weight sugar alcohol polyol selected from the group consisting of or selected from or selected from at least one of erythritol, xylitol, mannitol, isomalt, maltitol, lactitol, trehalose, lactose, tagatose, sucralose, and mixtures thereof; and modified starch having a dextrose equivalent from 4 to less than 15, wherein the sugar alcohol polyol and the modified starch are present at a weight ratio of the sugar alcohol polyol to the modified starch from 1:5 to 1:1; wherein the fabric care active agent, the water, and the sugar alcohol polyol are dispersed in the modified starch; and wherein the particles each have an exterior surface and an anti-caking agent is on the exterior surface.

A fabric care composition comprising a plurality of particles, wherein the particles comprise: a fabric care active agent selected from the group consisting of or selected from or selected from at least one of perfume, fabric softener active, cationic polymer, malodor control agent, and mixtures thereof; from 0% to 3% by weight plasticizer polyol that is liquid at 20 C and 1 atmosphere of pressure; from 1% to about 10%, preferably from about 3% to about 8%, by weight water; from about 15% to about 40%, preferably from about 20% to about 30%, by weight sugar alcohol polyol selected from the group consisting of or selected from or selected from at least one of erythritol, xylitol, mannitol, isomalt, maltitol, lactitol, trehalose, lactose, tagatose, sucralose, and mixtures thereof; and modified starch having a dextrose equivalent from 4 to less than 15 and the sugar alcohol polyol and the modified starch are present at a weight ratio of the sugar alcohol polyol to the modified starch from 1:5 to 1:1; wherein the fabric care active agent, the water, and the sugar alcohol polyol are dispersed in the modified starch; and wherein the particles each have an exterior surface and an anti-caking agent is on the exterior surface.

A process for treating laundry comprising the steps of: providing an article of laundry in a washing machine; dispensing the fabric care composition of one of the preceding three paragraphs into the washing machine; and contacting the article of laundry during a wash sub-cycle of the washing machine with the fabric care composition. Optionally, the fabric care active agent is perfume, the particles comprise from about 1% to about 20% by weight the perfume, and the perfume is a fragrance of plant origin.

DETAILED DESCRIPTION OF THE INVENTION

Figure 1:
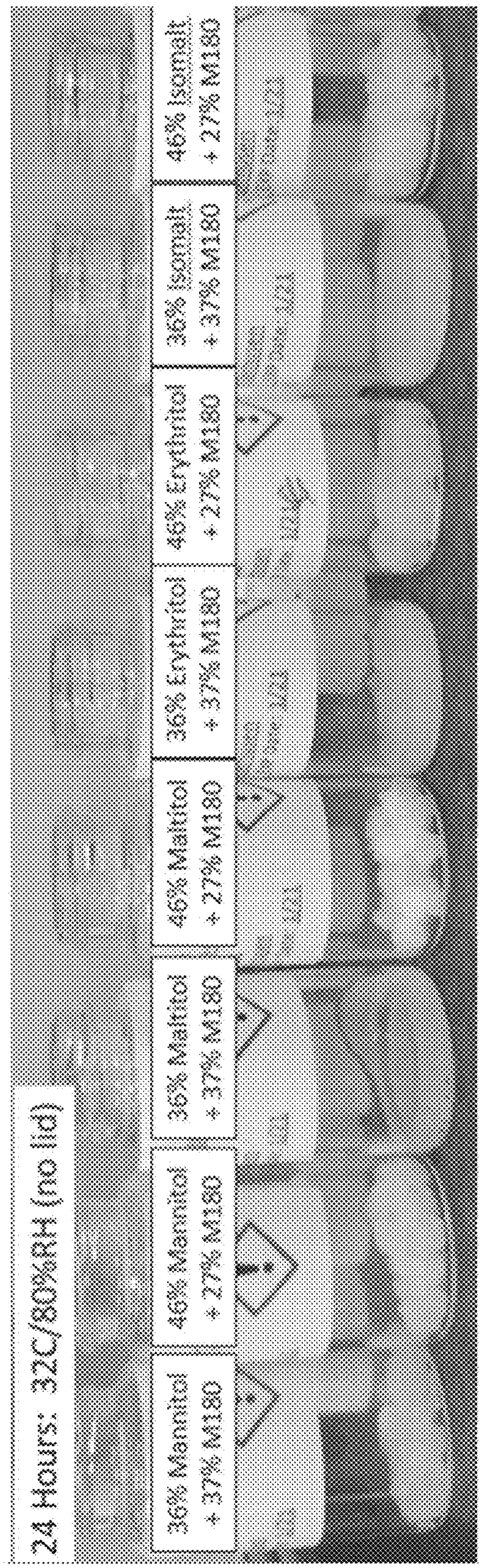
FIG. 1 is an image of particles of specimens 1 to 8 after the stability test.

The fabric care composition described herein can comprise a plurality of particles. The particles can be practical for providing benefits to laundry through the wash. That is, the particles can be employed by the user by dispensing the particles into the washing machine prior to starting the washing machine cycle, particularly the wash sub-cycle. Through the wash compositions, such as those described herein, differ from through the rinse compositions. Through the rinse compositions are designed to be dispensed during the rinse sub-cycle of the washing machine. In modern washing machines, the rinse sub-cycle is initiated automatically after the wash sub-cycle is completed, without any further input from the consumer. Compositions that are to be dispensed during the rinse sub-cycle are commonly dosed to a separate dosing chamber that is part of the washing machine that dispenses the through the rinse composition during the rinse sub-cycle, for example a dispensing drawer or from that agitator in the tub.

Some consumers desire compositions for treating laundry that are formulated entirely from, or at least partially from, ingredients that occur naturally. The ingredients may be sourced naturally or synthesized. Many such ingredients are familiar to consumers and some consumers prefer such ingredients over ingredients that do not naturally occur or perhaps do not exist in practical or sufficient quantities naturally to employ in fabric compositions, which are typically mass retail products.

Particulate fabric care compositions are easy for the consumer to dispense in measured quantities and are easy for the consumer to customize the amount of the composition he or she uses. The particles can comprise a fabric care active agent selected from the group consisting of or selected from or selected from at least one of perfume, fabric softener active, cationic polymer, dye transfer inhibitor, malodor control agent, and mixtures thereof. The particles can further comprise from 0% to 3% by weight of plasticizer polyol that is liquid at 20 C and 1 atmosphere of pressure. The particles can further comprise from 1% to about 20% by weight water. The particles can further comprise from about 45% to about 80% by weight a sugar alcohol polyol selected from the group consisting of or selected from or selected from at least one of erythritol, xylitol, mannitol, isomalt, maltitol, lactitol, trehalose, lactose, tagatose, sucralose, and mixtures thereof. The particles can further comprise modified starch. The fabric care active agent, the water, and the sugar alcohol polyol can be dispersed in the modified starch.

Beneficially, the fabric care active, plasticizer polyol, if present, water, sugar alcohol polyol, and modified starch are constituents of the particles. The weight fractions of the plasticizer polyol, which may be optionally present, water, and sugar alcohol polyol, may vary depending on the weight fraction and dextrose equivalent of the modified starch employed. Particles in which the weight fraction of plasticizer polyol is zero are contemplated.

Together, the modified starch, sugar alcohol polyol, plasticizer polyol, if present, and water together form a carrier for the fabric care active agent. The fabric care active agent can be selected from the group consisting of or selected from or selected from at least one of perfume, fabric softener active, cationic polymer, dye transfer inhibitor, malodor control agent, and mixtures thereof. The particles can comprise from about 0.1% to about 50% by weight fabric care active agent, or even from about 1% to about 40%, or even from about 1% to about 25%, by weight fabric care active agent. Similarly, the particles can comprise from about 2% to about 50% by weight fabric care active agent, optionally from about 3% to about 30%, further optionally from about 5% to about 25%, by weight fabric care active agent.

The amount of modified starch that can be provided can be described in terms of the weight ratio of sugar alcohol polyol to the modified starch. The particles can comprise a minimum of 1% by weight water. The particles can further comprise a certain minimum of sugar alcohol polyol than can depend on the amount of water. The particles can further comprise the fabric care active agent. The sum of the weight fractions of the fabric care active agent, plasticizer polyol, if present, water, sugar alcohol polyol, modified starch, and anti-caking agent, if present, is less than or equal to 100%.

Each of the particles can be a mixture of its constituent components. For instance, each of the particles can be a solidified mixture of the fabric care active agent, the plasticizer polyol, if present, the water, the sugar alcohol polyol, and the modified starch. Each of the particles can be a substantially homogeneous or homogeneous mixture of the fabric care active agent, the plasticizer polyol, if present, the water, the sugar alcohol polyol, and the modified starch. Each of the particles can be a substantially homogeneously or homogeneously structured particle. Substantially homogeneous structured particles have a degree of homogeneity consistent with or greater than that achievable with mixing technologies that can be practically employed to make laundry care products for the mass market. In other words, substantially homogeneous structured particles need not be completely homogeneous.

Fabric care active agents including perfume, fabric softener active, cationic polymer, dye transfer inhibitor, and malodor control agent are amenable to being provided as a particulate fabric care additive since the consumer can detect that the amount of consumer benefit achieved is a function of the quantity of the fabric care additive used. For instance, if the fabric care composition contains perfume, the consumer can notice an increased scent benefit is obtained when more fabric care composition is used as compared to when less is used. Moreover, the consumer can gain experience using the fabric care composition so that the consumer can select the amount of fabric care composition that is used to impart the desired level of benefit for a particular load of laundry. Similarly, consumers can also observe and learn how much fabric care composition to dose to a particular load of laundry to obtain the desire level of performance for fabric care compositions that contain fabric softener active, cationic polymer, dye transfer inhibitor, and malodor control agent.

The particles can each have a mass from about 1 mg to about 500 mg, alternatively from about 5 mg to about 500 mg, alternatively from about 5 mg to about 200 mg, alternatively from about 10 mg to about 100 mg, alternatively from about 20 mg to about 50 mg, alternatively from about 35 mg to about 45 mg, alternatively about 38 mg. An individual particle may have a volume from about 0.003 $cm^3$ to about 5 $cm^3$, optionally from about 0.003 $cm^3$ to about 1 $cm^3$, optionally from about 0.003 $cm^3$ to about 0.5 $cm^3$, optionally from about 0.003 $cm^3$ to about 0.2 $cm^3$, optionally from about 0.003 $cm^3$ to about 0.15 $cm^3$. Smaller particles are thought to provide for better packing of the particles in a container and faster dissolution in the wash. The composition can comprise less than 10% by weight of particles having an individual mass less than about 10 mg. This can reduce the potential for dust.

A plurality of particles may collectively comprise a dose for dosing to a laundry washing machine or laundry wash basin. A single dose of the plurality of particles may comprise from about 1 g to about 50 g of particles. A single dose of the plurality of particles may comprise from about 5 g to about 50 g, alternatively from about 10 g to about 45 g, alternatively from about 20 g to about 40 g, alternatively combinations thereof and any whole numbers of grams or ranges of whole numbers of grams within any of the aforementioned ranges. The smaller the individual particles the faster they tend to dissolve in water.

Modified Starch

The particles can comprise modified starch having a dextrose equivalent from 4 to 20. Modified starches are also referred to as starch derivatives. Modified starch can be prepared by physically, enzymatically, or chemically treating native starch to change its properties. Modified starch may be advantageous over unmodified starch due to modified starch being more water soluble than unmodified starch. Further, modified starch can be hydrated into a melt into which perfume can be emulsified. Particles that can be produced from a melt are convenient and inexpensive to manufacture in large quantities that are required to provide consumers with fabric care compositions.

The modified starch can have a dextrose equivalent from 4 to 12. Such modified starch is widely and inexpensively available. The solubility in water of modified starch tends to increase with increasing dextrose equivalent.

The modified starch can be maltodextrin. The maltodextrin can have a dextrose equivalent from about 4 to about 20. Such modified starch is inexpensive and widely available. The higher the dextrose equivalent of the modified starch, the faster the particles comprising such carrier material dissolve and the stickier the fabric care particles.

The maltodextrin can have a dextrose equivalent of about 10. Such maltodextrin may provide for a balance of low viscosity that may be appropriate for melt processing and solubility in water and not result in particles that are too sticky. Fabric care particles that are used in the wash cycle need to dissolve within a typical wash cycle time, which may be less than 20 minutes.

Particles may comprise from about 5% to about 30% by weight modified starch having a dextrose equivalent from 4 to 20. Particles may comprise from about 5% to about 30% by weight modified starch having a dextrose equivalent from 4 to less than 15. Particles may comprise from about 5% to about 30% by weight modified starch having a dextrose equivalent from 15 to 20. The weight fraction ratio of the sugar alcohol polyol to modified starch that may be desirable can depend on the dextrose equivalent of the modified starch. More particularly, the particles can comprise modified starch having a dextrose equivalent from 15 to 20 and the sugar alcohol polyol and the modified starch can be present at a weight ratio of the sugar alcohol polyol to the modified starch from 2:1 to 16:1, optionally from 2:1 to 10:1, further optionally from 2:1 to 3:1. Optionally, the particles can comprise modified starch having a dextrose equivalent from 4 to less than 15 and the sugar alcohol polyol and the modified starch can be present at a weight ratio of the sugar alcohol polyol to the modified starch from 1.5:1 to 16:1, optionally from 1.5:1 to 10:1, further optionally from 1.5:1 to 4:1.

The particles can comprise from about 5% to about 30%, optionally from about 10% to about 25%, further optionally from about 15% to about 20% by weight modified starch having a dextrose equivalent from 4 to 20. The particles can comprise from about 5% to about 23%, optionally from about 10% to about 20%, by weight modified starch having a dextrose equivalent from 15 to 20. The particles can comprise from about 5% to about 30%, optionally from about 10% to about 25%, further optionally from about 15% to about 20%, by weight modified starch having a dextrose equivalent from 4 to less than 15, optionally from 4 to 12.

Particles comprising the aforesaid ranges of modified starch having the ranges of dextrose equivalent set forth previously can comprise from about 45% to about 80% by weight sugar alcohol polyol selected from the group consisting of or selected from or selected from at least one of erythritol, xylitol, mannitol, isomalt, maltitol, lactitol, trehalose, lactose, tagatose, sucralose, and mixtures thereof. Moreover, particles comprising the aforesaid ranges of modified starch having the ranges of dextrose equivalent set forth previously can comprise from 1% to about 20%, optionally from 1% to about 15%, further optionally from 1% to about 12%, further optionally from about 3% to about 8%, further optionally from about 6% to about 8%, further optionally from 3% to about 10%, by weight water. Optionally, the particles disclosed herein can comprise from 0% to about 3% by weight plasticizer polyol that is liquid at 20 C and 1 atmosphere of pressure.

Particles may comprise from about 40% to about 80% by weight modified starch having a dextrose equivalent from 4 to less than 15. The weight fraction ratio of the sugar alcohol polyol to modified starch that may be desirable can depend on the dextrose equivalent of the modified starch. More particularly, the particles can comprise modified starch having a dextrose equivalent from 4 to less than 15 and the sugar alcohol polyol and the modified starch can be present at a weight ratio of the sugar alcohol polyol to the modified starch from 1:5 to 1:1, optionally from 1:3 to 1:1, further optionally from 1:2 to 1:1. Such particles can comprise from about 1% to about 10%, optionally from about 2% to about 8%, further optionally from about 3% to about 6%, by weight water. For particles having from about 40% to about 80% by weight modified starch having a dextrose equivalent from 4 to less than 15, the particles can comprise from about 15% to about 40% by weight sugar alcohol polyol selected from the group consisting of or selected from or selected from at least one of erythritol, xylitol, mannitol, isomalt, maltitol, lactitol, trehalose, lactose, tagatose, sucralose, and mixtures thereof. Optionally, the particles can comprise from 0% to about 3% by weight plasticizer polyol that is liquid at 20 C and 1 atmosphere of pressure. The particles may be provided with an anti-caking agent on the exterior surface of the particles if desirable for reducing the potential for particles to clump together.

The particles can comprise mannitol and maltodextrin having a dextrose equivalent of 10 at a weight ratio of 2:1 mannitol to maltodextrin.

The dextrose equivalent is defined as reducing sugars expressed as dextrose and calculated as a percentage of the dry substance. The dextrose equivalent can be measured according to Fitton, M. G., Rapid Determination of Dextrose Equivalent by Cryoscopy," Starch/Stärke, 31.11 (1979), 381-384. Dextrose equivalent is a number averaged value.

Sugar Alcohol Polyol

The particles can comprise a sugar alcohol polyol. A sugar alcohol polyol is an organic compound having more than two hydroxyl groups. The sugar alcohol polyol can have from 4 to 12 carbon atoms.

Making melt processed particles having modified starch as the carrier material can be difficult, in absence of the sugar alcohol polyol. Without the sugar alcohol polyol, too much water may be required to enable the modified starch and the fabric care active to be processed as a melt. And as a result of the high water content, the drying time for the melt to solidify into particles can be excessive. Further, drying of the melt removes some of the water, which may be a large fraction of the constituent material of the particle, thereby leaving behind a structure that may be too friable to be practical as a fabric care product. Further, in a high temperature or high humidity environment, which is not uncommon in a typical supply chain or consumer's household, particles that do not include a sugar alcohol polyol may tend to clump and ultimately gel into a single mass. Even if a provider of fabric care products could protect the particles from exposure to high temperature and high humidity, the particles might break apart too easily, resulting in a product that may be too messy to be enjoyable for consumers to use.

Sugar alcohol polyols tend to be less hygroscopic than sugars. Employing sugars in combination with modified starch tends to result in particles that are too sticky to be practical as a fabric care product. Employing a sugar alcohol polyol helps reduce the propensity of the particles to clump as compared to particles without such material. Sugar alcohol polyols that are not hygroscopic or have low hygroscopicity may perform better than sugar alcohol polyols that are appreciably hygroscopic relative to other sugar alcohol polyols.

Including a sugar alcohol polyol having from 4 to 12 carbon atoms with the modified starch can help to bind the modified starch together thereby helping to provide for a mechanically stable particle. Further, less water may be required to enable melt processing when a sugar alcohol polyol having from 4 to 24 carbon atoms is included. The less water there is in the melt, the less drying time required to form cohesive particles, and the less friable the particles.

The sugar alcohol polyol can be selected from the group consisting of or selected from or selected from at least one of erythritol, xylitol, mannitol, isomalt, maltitol, lactitol, trehalose, lactose, tagatose, sucralose, and mixtures thereof. A sugar alcohol polyol having from 4 to 6 carbon atoms can also function appropriately and such materials are widely available and inexpensive in the context of mass produced fabric care particles. The sugar alcohol polyol can be mannitol.

The weight ratio of the sugar alcohol polyol to the modified starch can be from 2:1 to 16:1, optionally from 2:1 to 10:1, optionally from 2:1 to 3:1, if the modified starch has a dextrose equivalent from 15 to 20. The weight ratio of the sugar alcohol to the modified starch can be from 1.5:1 to 16:1, optionally from 1.5:1 to 10:1, optionally from 1.5:1 to 4:1, if the modified starch has a dextrose equivalent from 4 to less than 15. Such formulations may be practical for particles that comprise from 45% to about 80% by weight sugar alcohol polyol as discussed above and from 1% to 20% by weight water.

Each of the particles can comprise from about 45% to about 80% by weight of the particles sugar alcohol polyol. Within the aforesaid lower range of the amount of sugar alcohol polyol, it can be desirable to employ from about 1% to about 20% by weight water, optionally about 3% to about 8% by weight water, and about 5% to about 45% by weight modified starch having a dextrose equivalent from 4 to 20, with the ratio of the sugar alcohol polyol to modified starch being as described above depending on the dextrose equivalent of the modified starch. The modified starch can have a dextrose equivalent from 4 to about 12.

Optionally, each of the particles can comprise from about 15% to about 40% by weight of the particles sugar alcohol polyol. This may be practical for modified starch having a dextrose equivalent from 4 to less than 15 and the sugar alcohol polyol and the modified starch being present at a weight ratio of the sugar alcohol polyol to the modified starch from 1:5 to 1:1, optionally from 1:3 to 1:1, further optionally from 1:2 to 1:1. Within the aforesaid lower range of the amount of sugar alcohol polyol, it can be desirable to employ from about 1% to about 10% by weight water, optionally about 3% to about 8% by weight water, and about 40% to about 80% by weight modified starch having a dextrose equivalent from 4 to less than 15, with the ratio of the sugar alcohol polyol to modified starch being as described above depending on the dextrose equivalent of the modified starch.

Each of the particles can further comprise a polyol having 3 or fewer carbons. Optionally, each of the particles can further comprise 0.1% to less than 12% by weight of the particles a polyol having 3 or fewer carbons.

Plasticizer Polyol

The particles can comprise from 0% to 3% by weight a plasticizer polyol. The particles can comprise from 0% to 3% by weight a plasticizer polyol that is liquid at 20 C and 1 atmosphere of pressure. The plasticizer polyol, which is optional, can aid with mixing the formulation components of the particles. An overabundance of plasticizer polyol can impede formation and stability of the particles. The plasticizer polyol can be glycerin. The plasticizer polyol can be dipropylene glycol. The plasticizer polyol can be propylene glycol. The plasticizer polyol can be selected from the group consisting of or selected from or selected from at least one of glycerin, dipropylene glycol, propylene glycol, and mixtures thereof.

Water

The particles can comprise from about 1% to about 20% by weight of the particles water. Water can be practical to include to help make the combination of modified starch and polyol melt processable. The particles can comprise from about 1% to about 12% by weight of the particles water, optionally about 3% to about 12% by weight of the particles water, optionally about 1.5% to about 12% by weight of the particles water, optionally about 2.5% to about 12% by weight of the particles water, optionally about 3.5% to about 12% by weight of the particles water, optionally about 3% to about 8% by weight of the particles water, optionally about 4% to about 12% by weight of the particles water, optionally about 1% to about 10% by weight of the particles water. Such weight fractions of water may be practical for particles having from about 45% to about 80% by weight sugar alcohol polyol. For particles having from about 15% to about 40% by weight sugar alcohol polyol and modified starch, 1% to about 10%, optionally about 2% to about 8%, further optionally about 4% to about 8%, by weight water may be suitable.

Making particles by hand becomes increasingly easier with greater amounts of water up to the level of water at which the composition cannot solidify in a reasonable amount time or without the addition or heat or otherwise removing some water from the composition to solidify the particles. Without being bound by theory, water may assist in mixing and forming the particles since the mechanical energy required for mixing is decreased by increasing the amount of water. Extrusion processes may impart more mixing energy so that particles having a weight fraction of water towards the lower end of the aforesaid ranges may be made by extrusion processes.

The source of the water may be water added to aid in mixing the constituent parts of the composition. The source of the water may be from a slurry that carries a fabric care active into the process used to make particles. For instance, encapsulated perfume is commonly carried in a water slurry. The encapsulate slurry may be about 60% by weight water.

Fabric Care Active

The particles can comprise a fabric care active selected from the group consisting of or selected from or selected from at least one of perfume, fabric softener active, cationic polymer, dye transfer inhibitor, malodor control agent, and mixtures thereof. The fabric care active agent can be plant derived. The particles can comprise from about 1% to about 50% by weight fabric care active agent, or even from about 1% to about 40%, or even from about 1% to about 25%, by weight fabric care active agent. Similarly, the particles can comprise from about 2% to about 50% by weight fabric care active agent, optionally from about 3% to about 30%, further optionally from about 5% to about 25%, by weight fabric care active agent.

Perfume

The fabric care active agent can be perfume. A perfume is an oil or fragrance that includes one or more odoriferous compounds, for example synthetic products of the ester, ether, aldehyde, ketone, alcohol, and hydrocarbon type. Mixtures of various odoriferous substances, which together produce an attractive fragrant note, can be used. Such perfume oils can also comprise natural mixtures of odoriferous compounds, as are available from vegetal sources.

Perfume can be a substantially water insoluble composition comprising perfume components, optionally mixed with a suitable solvent or diluent. Suitable solvents or diluents include compounds selected from the group consisting of or selected from or selected from at least one of ethanol, isopropanol, diethylene glycol monoethyl ether, dipropylene glycol, diethyl phthalate, triethyl citrate, and mixtures thereof.

The perfume can be provided as unencapsulated perfume. Unencapsulated perfume can be dispersed in the modified starch.

The perfume can be provided as encapsulated perfume. Perfume may be encapsulated in water soluble or water insoluble shell material. Encapsulate shell materials may include melamine-urea-formaldehyde, melamine formaldehyde, urea formaldehyde, starch, and the like materials. The encapsulate shell wall can be a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts; and mixtures thereof. When the shell comprises an aminoplast, the aminoplast may comprise polyurea, polyurethane, and/or polyureaurethane. The polyurea may comprise polyoxymethyleneurea and/or melamine formaldehyde. Encapsulates having a shell wall comprising a polysaccharide can be practical. The shell wall of encapsulates can be selected from the group consisting of or selected from or selected from at least one of chitosan, gum arabic, alginate, β-glucan, starch, starch derivatives, plant proteins, gelatin, alyssum homolocarpum seed gum, and combinations thereof.

The perfume can be provided in a perfume delivery system. Zeolite and cyclodextrin are examples of perfume delivery systems. The perfume can be encapsulated in starch. For example an emulsion of starch and perfume oil can be spray dried to form particles of starch having droplets of perfume dispersed within the starch matrix.

The perfume can comprise one or more fragrances of plant origin. A fragrance of plant origin is a concentrated hydrophobic liquid containing volatile chemical compound extracted from a plant. The fragrance of plant origin can be selected from the group consisting of or selected from or selected from at least one of almond oil, ambrette, angelica seeds oil, armoise oil, basil oil grand vert, benzoin resinoid, bergamot essential oil, bergamot oil, black pepper oil, black pepper essence, black currant essence, blood orange oil, bois des landes, brandy pure jungle essence, cade, camomille romaine he, cardamom guat extract, cardamom oil, carrot heart, caryophyllene extra, cedar, cedarleaf, cedarwood oil, cinnamon bark ceylon, cinnamon ceylan extract, beeswax, citronella, citronellal, clary sage essential oil, clove leaf oil rectified, copaiba balsam, coriander, cos cos anethol, cos cos essence coriandre russie, cucumber extract, cumin oil, cypriol heart, elemi coeur, elemi oil, english white camomile, cucalyptol, *Eucalyptus citriodora*, cugenol, galbanum heart, ginger, grapefruit replacer, guaiacwood oil, gurjum oil, healingwood blo, helichrysum, iso eugenol, jasmine sambac, juniper berry oil, key lime, labdanum resinoid, lavandin abrialis oil, lavandin grosso, lavender essential oil, lemon cedrat, lemon oil, lemon peel verdelli, lemongrass, lemongrass oil, *Litsea cubeba*, magnolia flower oil, mandarin oil yellow, menthol cristalisé, mint piperita cascade, narcisse, neroli oil, nutmeg, orange flower water, orange oil, orange phase oil, organic rose water, osmanthus, patchouli, patchouli heart, patchouli oil, pepper black oil, peppermint, peru balsam absolute, petitgrain t'less, pimento berry oil, pink pepper, raspberry essence, rhodinol, rose, rose centifolia, sandalwood, sichuan pepper extract, styrax white, sweet orange oil, tangerine oil, vanilla, vetiver, violet leaves, violette feuilles, wormwood oil, and combinations thereof.

The particles can comprise from about 0.1% to about 50%, optionally from about 1% to about 40%, optionally from about 0.1% to about 20% by weight of said particles perfume, optionally from about 0.1% to about 15%, optionally from about 0.1% to about 12%, optionally from about 1% to about 15%, optionally from about 2% to about 20%, optionally from about 8% to about 10% by weight of said particles perfume.

Fabric Softener Active

The fabric care active agent can be a fabric softener active. The fabric softener can be a polysiloxane, a fabric softening clay, a cationic polymer, or mixture thereof. For example, the fabric softener active can be polydimethylsiloxane.

The particles can comprise a quaternary ammonium compound so that the particles can provide a softening benefit to laundered fabrics through the wash, and in particular during the wash sub-cycle of a washer having wash and rinse sub-cycles. The quaternary ammonium compound (quat) can be an ester quaternary ammonium compound. Suitable quaternary ammonium compounds include but are not limited to, materials selected from the group consisting of or selected from or selected from at least one of ester quats, amide quats, imidazoline quats, alkyl quats, amidoester quats and combinations thereof. Suitable ester quats include but are not limited to, materials selected from the group consisting of or selected from or selected from at least one of monoester quats, diester quats, triester quats and combinations thereof.

The particles can comprise about 5% to about 45% by weight of the particles a quaternary ammonium compound. The quaternary ammonium compound can optionally have an Iodine Value from about 18 to about 60, optionally about 18 to about 56, optionally about 20 to about 60, optionally about 20 to about 56, optionally about 20 to about 42, and any whole numbers within the aforesaid ranges. Optionally the particles can comprise about 10% to about 40% by weight of the particles a quaternary ammonium compound, further optionally having any of the aforesaid ranges of Iodine Value. Optionally the particles can comprise about 20% to about 40% by weight of the particles a quaternary ammonium compound, further optionally having the aforesaid ranges of Iodine Value.

The quaternary ammonium compound can be selected from the group consisting of or selected from or selected from at least one of esters of bis-(2-hydroxypropyl)-dimethylammonium methylsulfate, isomers of esters of bis-(2-hydroxypropyl)-dimethylammonium methylsulfate and fatty acid, N,N-bis-(stearoyl-2-hydroxypropyl)-N,N-dimethylammonium methylsulfate, esters of bis-(2-hydroxypropyl)-dimethylammonium methylsulfate, isomers of esters of bis-(2-hydroxypropyl)-dimethylammonium methylsulfate, esters of N,N-bis(hydroxyethyl)-N,N-dimethyl ammonium chloride, N,N-bis(stearoyl-oxy-ethyl)-N,N-dimethyl ammonium chloride, esters of N,N,N-tri(2-hydroxyethyl)-N-methyl ammonium methylsulfate, N,N-bis-(palmitoyl-2-hydroxypropyl)-N,N-dimethylammonium methylsulfate, N,N-bis-(stearoyl-2-hydroxypropyl)-N,N-dimethylammonium chloride, 1,2-di-(stearoyl-oxy)-3-trimethyl ammoniumpropane chloride, dicanoladimethylammonium chloride, di(hard)tallowdimethylammonium chloride, dicanoladimethylammonium methylsulfate, 1-methyl-1-stearoylamidoethyl-2-stearoylimidazolinium methylsulfate, imidazoline quat (no longer used by P&G): 1-tallowylamidoethyl-2-tallowylimidazoline, dipalmitoylmethyl hydroxyethylammonium methylsulfate, dipalmylmethyl hydroxyethylammoinum methylsulfate, 1,2-di(acyloxy)-3-trimethylammoniopropane chloride, and mixtures thereof.

A quaternary ammonium compound can comprise compounds of the formula:

$$\{R^2{}_{4-m}—N^+—[X—Y—R^1]_m\}A^- \quad (1)$$

wherein:

- m is 1, 2 or 3 with proviso that the value of each m is identical;
- each $R^1$ is independently hydrocarbyl, or substituted hydrocarbyl group;
- each $R^2$ is independently a $C_1$-$C_3$ alkyl or hydroxyalkyl group, preferably $R^2$ is selected from methyl, ethyl, propyl, hydroxyethyl, 2-hydroxypropyl, 1-methyl-2-hydroxyethyl, poly($C_2$-3 alkoxy), polyethoxy, benzyl;
- each X is independently $(CH_2)n$, $CH_2—CH(CH_3)—$ or $CH—(CH_3)—CH_2—$ and
- each n is independently 1, 2, 3 or 4, preferably each n is 2;
- each Y is independently —O—(O)C— or —C(O)—O—;
- A- is independently selected from the group consisting of or selected from or selected from at least one of chloride, methylsulfate, ethylsulfate, and sulfate, preferably A- is selected from the group consisting of or selected from or selected from at least one of chloride and methyl sulfate;

with the proviso that the sum of carbons in each $R^1$, when Y is —O—(O)C—, is from 13 to 21, preferably the sum of carbons in each $R^1$, when Y is —O—(O)C—, is from 13 to 19.

The quaternary ammonium compound can comprise compounds of the formula:

[R3N+CH2CH(YR1)(CH2YR1)]X— wherein each Y, R, R1, and X— have the same meanings as before. Such compounds include those having the formula:

[CH3]3N(+)[CH2CH(CH2O(O)CR1)O(O)CR1]C1(−) (2)

wherein each R is a methyl or ethyl group and preferably each R1 is in the range of C15 to C19. As used herein, when the diester is specified, it can include the monoester that is present.

An example of a preferred DEQA (2) is the "propyl" ester quaternary ammonium fabric softener active having the formula 1,2-di(acyloxy)-3-trimethylammoniopropane chloride. A third type of preferred fabric softening active has the formula:

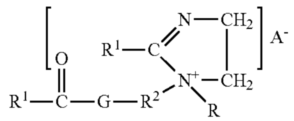

(3)

wherein each R, R1, and A- have the definitions given above; each R2 is a C1-6 alkylene group, preferably an ethylene group; and G is an oxygen atom or an —NR— group;

The quaternary ammonium compound can comprise compounds of the formula:

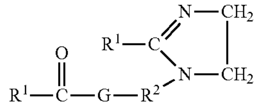

(4)

wherein R1, R2 and G are defined as above.

The quaternary ammonium compound can comprise compounds that are condensation reaction products of fatty acids with dialkylenetriamines in, e.g., a molecular ratio of about 2:1, said reaction products containing compounds of the formula:

R1-C(O)—NH—R2-NH—R3-NH—C(O)—R1 (5)

wherein R1, R2 are defined as above, and each R3 is a C1-6 alkylene group, optionally an ethylene group and wherein the reaction products may optionally be quaternized by the additional of an alkylating agent such as dimethyl sulfate.

The quaternary ammonium compound can comprise compounds of the formula:

[R1-C(O)—NR—R2-N(R)2-R3-NR—C(O)—R1]+A- (6)

wherein R, R1, R2, R3 and A- are defined as above;

The quaternary ammonium compound can comprise compounds that are reaction products of fatty acid with hydroxyalkylalkylenediamines in a molecular ratio of about 2:1, said reaction products containing compounds of the formula:

R1-C(O)—NH—R2-N(R3OH)—C(O)—R1 (7)

wherein R1, R2 and R3 are defined as above;

A eighth type of preferred fabric softening active has the formula:

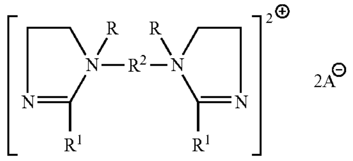

(8)

wherein R, R1, R2, and A- are defined as above.

Non-limiting examples of compound (1) are N,N-bis (stearoyl-oxy-ethyl) N,N-dimethyl ammonium chloride, N,N-bis(tallowoyl-oxy-ethyl) N,N-dimethyl ammonium chloride, N,N-bis(stearoyl-oxy-ethyl) N-(2hydroxyethyl) N-methyl ammonium methylsulfate.

Non-limiting examples of compound (2) is 1,2 di (stearoyl-oxy) 3 trimethyl ammoniumpropane chloride.

A non-limiting example of Compound (3) is 1-methyl-1-stearoylamidoethyl-2-stearoylimidazolinium methylsulfate wherein R1 is an acyclic aliphatic C15-C17 hydrocarbon group, R2 is an ethylene group, G is a NH group, R5 is a methyl group and A- is a methyl sulfate anion, available commercially from the Witco Corporation under the trade name VARISOFT.

A non-limiting example of Compound (4) is 1-tallowylamidoethyl-2-tallowylimidazoline wherein R1 is an acyclic aliphatic C15-C17 hydrocarbon group, R2 is an ethylene group, and G is a NH group.

A non-limiting example of Compound (5) is the reaction products of fatty acids with diethylenetriamine in a molecular ratio of about 2:1, said reaction product mixture containing N,N"-dialkyldiethylenetriamine with the formula:

R1-C(O)—NH—CH2CH2-NH—CH2CH2-NH—C(O)—R1 wherein R1-C(O) is an alkyl group of a commercially available fatty acid derived from a vegetable or animal source, such as EMERSOL 223LL or EMERSOL 7021, available from Henkel Corporation, and R2 and R3 are divalent ethylene groups.

A non-limiting example of Compound (6) is a difatty amidoamine based softener having the formula:

[R1-C(O)—NH—CH2CH2-N(CH3)(CH2CH2OH)—CH2CH2-NH—C(O)—R1]+CH3SO4- wherein R1-C(O) is an alkyl group, available commercially from the Witco Corporation e.g. under the trade name VARISOFT 222LT.

An example of Compound (7) is the reaction products of fatty acids with N-2-hydroxyethylethylenediamine in a molecular ratio of about 2:1, said reaction product mixture containing a compound of the formula:

R1-C(O)—NH—CH2CH2-N(CH2CH2OH)—C(O)—R1 wherein R1-C(O) is an alkyl group of a commercially available fatty acid derived from a vegetable or animal source, such as EMERSOL 223LL or EMERSOL 7021, available from Henkel Corporation.

An example of Compound (8) is the diquaternary compound having the formula:

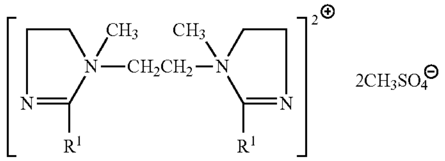

wherein R1 is derived from fatty acid, and the compound is available from Witco Company.

The quaternary ammonium compound can be di-(tallowoyloxyethyl)-N,N-methylhydroxyethylammonium methyl sulfate.

It will be understood that combinations of quaternary ammonium compounds disclosed above are suitable for use in this invention.

In the cationic nitrogenous salts herein, the anion A-, which is any softener compatible anion, provides electrical neutrality. Most often, the anion used to provide electrical neutrality in these salts is from a strong acid, especially a halide, such as chloride, bromide, or iodide. However, other anions can be used, such as methylsulfate, ethylsulfate, acetate, formate, sulfate, carbonate, and the like. Chloride and methylsulfate can be the anion A. The anion can also carry a double charge in which case A- represents half a group.

The particles can comprise from about 10 to about 40% by weight quaternary compound.

The iodine value of a quaternary ammonium compound is the iodine value of the parent fatty acid from which the compound is formed, and is defined as the number of grams of iodine which react with 100 grams of parent fatty acid from which the compound is formed.

First, the quaternary ammonium compound is hydrolysed according to the following protocol: 25 g of quaternary ammonium compound is mixed with 50 mL of water and 0.3 mL of sodium hydroxide (50% activity). This mixture is boiled for at least an hour on a hotplate while avoiding that the mixture dries out. After an hour, the mixture is allowed to cool down and the pH is adjusted to neutral (pH between 6 and 8) with sulfuric acid 25% using pH strips or a calibrated pH electrode.

Next the fatty acid is extracted from the mixture via acidified liquid-liquid extraction with hexane or petroleum ether: the sample mixture is diluted with water/ethanol (1:1) to 160 mL in an extraction cylinder, 5 grams of sodium chloride, 0.3 mL of sulfuric acid (25% activity) and 50 mL of hexane are added. The cylinder is stoppered and shaken for at least 1 minute. Next, the cylinder is left to rest until 2 layers are formed. The top layer containing the fatty acid in hexane is transferred to another recipient. The hexane is then evaporated using a hotplate leaving behind the extracted fatty acid.

Next, the iodine value of the parent fatty acid from which the fabric softening active is formed is determined following ISO3961:2013. The method for calculating the iodine value of a parent fatty acid comprises dissolving a prescribed amount (from 0.1-3 g) into 15 mL of chloroform. The dissolved parent fatty acid is then reacted with 25 mL of iodine monochloride in acetic acid solution (0.1M). To this, 20 mL of 10% potassium iodide solution and 150 mL deionised water is added. After the addition of the halogen has taken place, the excess of iodine monochloride is determined by titration with sodium thiosulphate solution (0.1M) in the presence of a blue starch indicator powder. At the same time a blank is determined with the same quantity of reagents and under the same conditions. The difference between the volume of sodium thiosulphate used in the blank and that used in the reaction with the parent fatty acid enables the iodine value to be calculated.

The quaternary ammonium compound can be that used as part of BOUNCE dryer sheets available from The Procter & Gamble Company, Cincinnati, Ohio, USA. The quaternary ammonium compound can be the reaction product of triethanolamine and partially hydrogenated tallow fatty acids quaternized with dimethyl sulfate.

The fabric softening active can be plant derived. For example, the fabric softening active can be selected from the group consisting of or selected from or selected from at least one of aloe, coconut oil, glycerin, and mixtures thereof.

The particles can comprise from about 0.1% to about 50%, optionally from about 0.1% to about 40%, optionally from about 0.1% to about 20%, optionally from about 0.1% to about 15%, optionally from about 0.1% to about 12%, optionally from about 1% to about 15%, optionally from about 2% to about 20%, optionally from about 8% to about 10% by weight fabric softening active.

Cationic Polymer

The fabric care active agent can be cationic polymer. Cationic polymers can provide the benefit of a deposition aid that helps to deposit onto the fabric quaternary ammonium compound and possibly some other benefit agents that are contained in the particles.

The particles can comprise about 0.5% to about 10% by weight of the particles cationic polymer. Optionally, the particles can comprise about 0.5% to about 5% by weight of the particles cationic polymer, or even about 1% to about 5% by weight of the particles, or even about 2% to about 4% by weight of the particles cationic polymer, or even about 3% by weight of the particles cationic polymer. Without being bound by theory, it is thought that the cleaning performance of laundry detergent in the wash decreases with increasing levels of cationic polymer in the particles and acceptable cleaning performance of the detergent can be maintained within the aforesaid ranges.

The cationic polymer can have a cationic charge density more than about 0.05 meq/g (meq meaning milliequivalents), to 23 meq/g, preferably from about 0.1 meq/g to about 4 meq/g. even more preferably from about 0.1 meq/g to about 2 meq/g and most preferably from 0.1 meq/g to about 1 meq/g.

The above referenced cationic charge densities can be at the pH of intended use, which can be a pH from about 3 to about 9, optionally about 4 to about 9. Cationic charge density of a polymer refers to the ratio of the number of positive charges on the polymer to the molecular weight of the polymer. Charge density is calculated by dividing the number of net charges per repeating unit by the molecular weight of the repeating unit. The positive charges may be located on the backbone of the polymers and/or the side chains of polymers. The average molecular weight of such suitable cationic polymers can generally be between about 10,000 and about 10 million, or even between about 50,000 and about 5 million, or even between about 100,000 and about 3 million.

Non-limiting examples of cationic polymers are cationic or amphoteric, polysaccharides, proteins and synthetic polymers. Cationic polysaccharides include cationic cellulose derivatives, cationic guar gum derivatives, chitosan and its derivatives and cationic starches. Cationic polysaccharides have a molecular weight from about 1,000 to about 2 million, preferably from about 100,000 to about 800,000. Suitable cationic polysaccharides include cationic cellulose ethers, particularly cationic hydroxyethylcellulose and cationic hydroxypropylcellulose. Particularly preferred are cationic cellulosic polymers with substituted anhydroglucose units that correspond to the general Structural Formula as follows:

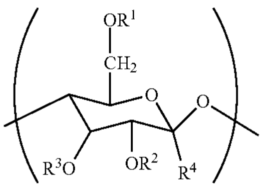

Wherein $R^1$, $R^2$, $R^3$ are each independently selected from H, $CH_3$, $C_{8-24}$ alkyl (linear or branched),

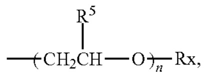,

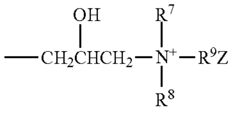

or mixtures thereof;

$R^4$ is H, n is from about 1 to about 10;

Rx is selected from the group consisting of H, $CH_3$, $C_{8-24}$ alkyl (linear or branched),

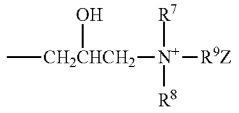

or mixtures thereof, wherein Z is a water soluble anion, preferably a chlorine ion and/or a bromine ion; $R^5$ is H, $CH_3$, $CH_2CH_3$, or mixtures thereof; $R^7$ is $CH_3$, $CH_2CH_3$, a phenyl group, a $C_{8-24}$ alkyl group (linear or branched), or mixture thereof; and $R^8$ and $R^9$ are each independently $CH_3$, $CH_2CH_3$, phenyl, or mixtures thereof:

With the provisio that at least one of $R^1$, $R^2$, $R^3$ groups per anhydroglucose unit is

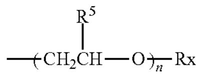

and each polymer has at least one

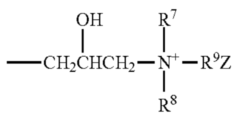

group.

The charge density of the cationic celluloses herein (as defined by the number of cationic charges per 100 anhydroglucose units) is preferably from about 0.5% to about 60%, more preferably from about 1% to about 20%, and most preferably from about 2% to about 10%.

Alkyl substitution on the anhydroglucose rings of the polymer ranges from about 0.01% to 5% per glucose unit, more preferably from about 0.05% to 2% per glucose unit, of the polymeric material.

The cationic cellulose may lightly cross-linked with a dialdehyde such as glyoxyl to prevent forming lumps, nodules or other agglomerations when added to water at ambient temperatures.

Examples of cationic hydroxyalkyl cellulose include those with the INCI name Polyquaternium 10 such as those sold under the trade names UCARE POLYMER JR 30M, JR 400, JR 125, LR 400 and LK 400, POLYMER PK polymers; Polyquaternium 67 such as those sold under the trade name SOFTCAT SK™, all of which are marketed by Dow Chemicals, Midland MI, and Polyquaternium 4 such as those sold under the trade name CELQUAT H200 and CELQUAT L-200 available from National Starch and Chemical Company, Bridgewater, NJ. Other suitable polysaccharides include Hydroxyethyl cellulose or hydoxypropylcellulose quaternized with glycidyl $C_{12}$-$C_{22}$ alkyl dimethyl ammonium chloride. Examples of such polysaccharides include the polymers with the INCI names Polyquaternium 24 such as those sold under the trade name QUATERNIUM LM 200 by Dow Chemicals of Midland, MI. Cationic starches refer to starch that has been chemically modified to provide the starch with a net positive charge in aqueous solution at pH 3. This chemical modification includes, but is not limited to, the addition of amino and/or ammonium group(s) into the starch molecules. Non-limiting examples of these ammonium groups may include substituents such as trimethylhydroxypropyl ammonium chloride, dimethylstearylhydroxypropyl ammonium chloride, or dimethyldodecylhydroxypropyl ammonium chloride. The source of starch before chemical modification can be chosen from a variety of sources including tubers, legumes, cercal, and grains. Non-limiting examples of this source of starch may include corn starch, wheat starch, rice starch, waxy corn starch, oat starch, cassaya starch, waxy barley, waxy rice starch, glutenous rice starch, sweet rice starch, amioca, potato starch, tapioca starch, oat starch, sago starch, sweet rice, or mixtures thereof. Nonlimiting examples of cationic starches include cationic maize starch, cationic tapioca, cationic potato starch, or mixtures thereof. The cationic starches may comprise amylase, amylopectin, or maltodextrin. The cationic starch may comprise one or more additional modifications. For example, these modifications may include cross-linking, stabilization reactions, phophorylations, hydrolyzations, cross-linking. Stabilization reactions may include alkylation and esterification. Suitable cationic starches for use in the present compositions are commercially-available from Cerestar under the trade name C*BOND® and from National Starch and Chemical Company under the trade name CATO 2A. Cationic galactomannans include cationic guar gums or cationic locust bean gum. An example of a cationic guar gum is a quaternary ammonium derivative of Hydroxypropyl Guar such as those sold under the trade name JAGUAR C13 and JAGUAR EXCEL available from Rhodia, Inc of Cranbury NJ and N-HANCE by Aqualon, Wilmington, DE Other suitable cationic polymers for use in the particles include polysaccharide polymers, cationic guar gum derivatives, quaternary nitrogen-containing cellulose ethers, synthetic polymers, copolymers of etherified cellulose, guar and starch. When used, the cationic polymers herein are either soluble in the composition used to form the particles or are soluble in a complex coacervate phase in the composition from which the particles are formed. Suitable cationic polymers are described in U.S. Pat. Nos. 3,962,418; 3,958,581; and U.S. Publication No. 2007/0207109A1.

One group of suitable cationic polymers includes those produced by polymerization of ethylenically unsaturated monomers using a suitable initiator or catalyst, such as those disclosed in WO 00/56849 and U.S. Pat. No. 6,642,200. Suitable cationic polymers may be selected from the group consisting synthetic polymers made by polymerizing one or more cationic monomers selected from the group consisting of or selected from or selected from at least one of N,N-dialkylaminoalkyl acrylate, N,N-dialkylaminoalkyl methacrylate, N,N-dialkylaminoalkyl acrylamide, N,N-dialkylaminoalkylmethacrylamide, quaternized N,N dialkylaminoalkyl acrylate quaternized N,N-dialkylaminoalkyl methacrylate, quaternized N,N-dialkylaminoalkyl acrylamide, quaternized N,N-dialkylaminoalkylmethacrylamide, Methacryloamidopropyl-pentamethyl-1,3-propylene-2-ol-ammonium dichloride, N,N,N,N',N',N",N"-heptamethyl-N"-3-(1-oxo-2-methyl-2-propenyl)aminopropyl-9-oxo-8-azo-decane-1,4,10-triammonium trichloride, vinylamine and its derivatives, allylamine and its derivatives, vinyl imidazole, quaternized vinyl imidazole and diallyl dialkyl ammonium chloride and combinations thereof, and optionally a second monomer selected from the group consisting of or selected from or selected from at least one of acrylamide, N,N-dialkyl acrylamide, methacrylamide, N,N-dialkylmethacrylamide, $C_1$-$C_{12}$ alkyl acrylate, $C_1$-$C_{12}$ hydroxyalkyl acrylate, polyalkylene glyol acrylate, $C_1$-$C_{12}$ alkyl methacrylate, $C_1$-$C_{12}$ hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and derivatives, acrylic acid, methacrylic acid, maleic acid, vinyl sulfonic acid, styrene sulfonic acid, acrylamidopropylmethane sulfonic acid (AMPS) and their salts. The polymer may optionally be branched or cross-linked by using branching and crosslinking monomers. Branching and crosslinking monomers include ethylene glycoldiacrylate divinylbenzene, and butadiene. A suitable polyethyleneinine useful herein is that sold under the tradename LUPASOL by BASF, AG, Lugwigschaefen, Germany In another aspect, the cationic polymer may be selected from the group consisting of or selected from or selected from at least one of cationic polysaccharide, polyethylene imine and its derivatives, poly(acrylamide-co-diallyldimethylammonium chloride), poly(acrylamide-methacrylamidopropyltrimethyl ammonium chloride), poly(acrylamide-co-N,N-dimethyl aminoethyl acrylate) and its quaternized derivatives, poly(acrylamide-co-N,N-dimethyl aminoethyl methacrylate) and its quaternized derivative, poly(hydroxyethylacrylate-co-dimethyl aminoethyl methacrylate), poly (hydroxpropylacrylate-co-dimethyl aminoethyl methacrylate), poly(hydroxpropylacrylate-co-methacrylamidopropyltrimethylammonium chloride), poly (acrylamide-co-diallyldimethylammonium chloride-co-acrylic acid), poly(acrylamide-methacrylamidopropyltrimethyl ammonium chloride-co-acrylic acid), poly(diallyldimethyl ammonium chloride), poly(vinylpyrrolidone-co-dimethylaminoethyl methacrylate), poly(ethyl methacrylate-co-quaternized dimethylaminoethyl methacrylate), poly(ethyl methacrylate-co-oleyl methacrylate-co-diethylaminoethyl methacrylate), poly(diallyldimethylammonium chloride-co-acrylic acid), poly(vinyl pyrrolidone-co-quaternized vinyl imidazole) and poly (acrylamide-co-Methacryloamidopropyl-pentamethyl-1,3-propylene-2-ol-ammonium dichloride), Suitable cationic polymers include Polyquaternium-1, Polyquaternium-5, Polyquaternium-6, Polyquaternium-7, Polyquaternium-8, Polyquaternium-10, Polyquaternium-11, Polyquaternium-14, Polyquaternium-22, Polyquaternium-28, Polyquaternium-30, Polyquaternium-32 and Polyquaternium-33, as named under the International Nomenclature for Cosmetic Ingredients.

In another aspect, the cationic polymer may comprise polyethyleneimine or a polyethyleneimine derivative. In another aspect, the cationic polymer may comprise a cationic acrylic based polymer. In a further aspect, the cationic polymer may comprise a cationic polyacrylamide. In another aspect, the cationic polymer may comprise a polymer comprising polyacrylamide and polymethacrylamidoproply trimethylammonium cation. In another aspect, the cationic polymer may comprise poly(acrylamide-N-dimethyl aminoethyl acrylate) and its quaternized derivatives. In this aspect, the cationic polymer may be that sold under the tradename SEDIPUR, available from BTC Specialty Chemicals, a BASF Group, Florham Park, N.J. In a yet further aspect, the cationic polymer may comprise poly(acrylamide-co-methacrylamidopropyltrimethyl ammonium chloride). In another aspect, the cationic polymer may comprise a non-acrylamide based polymer, such as that sold under the tradename RHEOVIS CDE, available from Ciba Specialty Chemicals, a BASF group, Florham Park, N.J., or as disclosed in US Patent Publication 2006/0252668.

In another aspect, the cationic polymer may be selected from the group consisting of or selected from or selected from at least one of cationic polysaccharides. In one aspect, the cationic polymer may be selected from the group consisting of or selected from or selected from at least one of cationic cellulose ethers, cationic galactomanan, cationic guar gum, cationic starch, and combinations thereof.

Another group of suitable cationic polymers may include alkylamine-epichlorohydrin polymers which are reaction products of amines and oligoamines with epicholorohydrin. Examples include dimethylamine-epichlorohydrin-ethylenediamine, available under the trade name CARTAFIX CB, CARTAFIX TSF, available from Clariant, Basle, Switzerland.

Another group of suitable synthetic cationic polymers may include polyamidoamine-epichlorohydrin (PAE) resins of polyalkylenepolyamine with polycarboxylic acid. The most common PAE resins are the condensation products of diethylenetriamine with adipic acid followed by a subsequent reaction with epichlorohydrin. They are available from Hercules Inc. of Wilmington DE under the trade name KYMENE from BASF AG (Ludwigshafen, Germany) under the trade name LURESIN.

The cationic polymers may contain charge neutralizing anions such that the overall polymer is neutral under ambient conditions. Non-limiting examples of suitable counter ions (in addition to anionic species generated during use) include chloride, bromide, sulfate, methylsulfate, sulfonate, methylsulfonate, carbonate, bicarbonate, formate, acetate, citrate, nitrate, and mixtures thereof.

The weight-average molecular weight of the cationic polymer may be from about 500 to about 5,000,000, or from about 1,000 to about 2,000,000, or from about 5000 to about 1,000,000 Daltons, as determined by size exclusion chromatography relative to polyethyleneoxide standards with RI detection. In one aspect, the weight-average molecular weight of the cationic polymer may be from about 100,000 to about 800,000 Daltons.

The cationic polymer can be a plant based cationic polymer. For example, the cationic polymer can be selected from the group consisting of or selected from or selected from at least one of cationic cyclodextrin, cationic cellulose, cationic gelatin, cationic dextran, cationic chitosan, and mixtures thereof.

The cationic polymer can be provided in a powder form. The cationic polymer can be provided in an anhydrous state. The particles can comprise from about 0.1% to about 50%, optionally from about 0.1% to about 40%, optionally from about 0.1% to about 20%, optionally about 1% to about 20%, optionally from about 0.1% to about 15%, optionally from about 0.1% to about 12%, optionally from about 1% to about 15%, optionally from about 2% to about 20%, optionally from about 8% to about 10% by weight cationic polymer.

Dye Transfer Inhibitor

The particles can comprise a dye transfer inhibitor.

The dye transfer inhibitor can be a graft copolymer.

The graft copolymer can comprise: (a) a polyalkylene oxide which has a number average molecular weight of from about 1000 to about 20000 Da and is based on ethylene oxide, propylene oxide, or butylene oxide; and (b) a vinyl ester derived from a saturated monocarboxylic acid containing from 1 to 6 carbon atoms; wherein (a) and (b) are present at a weight ratio of (a):(b) of from about 1:0.1 to about 1:2. The polyalkylene oxide can be based on ethylene oxide. The vinyl ester can be derived from a saturated monocarboxylic acid containing from 1 to 3 carbon atoms. The vinyl ester is vinyl acetate or a derivative thereof. (a) and (b) can be present at a weight ratio of (a):(b) of from about 1:0.1 to about 1:1.7. From about 1 mol % to about 60 mol % of (b) can be hydrolyzed. The graft copolymer can be a graft copolymer VAc-gPEG4000 available from BASF, Ludwigshafen, Germany. Synthesis of graft copolymer VAc-gPEG4000 is described in WO 01/05874.

The graft copolymer can comprise (a) a polyalkylene oxide which has a number average molecular weight of from about 1000 to about 20000 Da and is based on ethylene oxide, propylene oxide, or butylene oxide; (b) N-vinylpyrrolidone; and (c) vinyl ester derived from a saturated monocarboxylic acid containing from 1 to 6 carbon atoms; wherein (a) and (b) are present at a weight ratio of (a):(b) of from about 1:0.1 to about 1:1; wherein by weight, (a) is present in an amount greater than (c); wherein order of addition of (b) and (c) in graft polymerization is immaterial. The polyalkylene oxide can be based on ethylene oxide. The vinyl ester is derived from a saturated monocarboxylic acid containing from 1 to 3 carbon atoms. The vinyl ester can be vinyl acetate or a derivative thereof. (a) and (b) can be present at a weight ratio of (a):(b) of from about 1:0.2 to about 1:0.7. (a) and (c) can be present at a weight ratio of (a):(c) of from about 1:0.1 to about 1:0.8. (b) and (c) can be present at a weight ratio of (b):(c) of from about 1:0.1 to about 1:4. From about 1 mol % to about 60 mol % of (c) can be hydrolyzed.

The particles can comprise from about 0.1% to about 50%, optionally from about 0.1% to about 40%, optionally from about 0.1% to about 20%, optionally about 1% to about 20%, optionally from about 0.1% to about 15%, optionally from about 0.1% to about 12%, optionally from about 1% to about 15%, optionally from about 2% to about 20%, optionally from about 8% to about 10% by weight dye transfer inhibitor.

Malodor Control Agent

The fabric care active agent can be a malodor control agent. The malodor control agent can be any material capable of absorbing, suppressing, neutralizing, and or eliminating malodors. The malodor control agent can be selected from the group consisting of or selected from or selected from at least one of host-guest compound, malodor binding material, malodor neutralizing material, and combinations thereof. The malodor control agent can be selected from the group consisting of or selected from or selected from at least one of α-cyclodextrin, α-cyclodextrin derivatives, β-cyclodextrin, β-cyclodextrin derivatives, γ-cyclodextrin, γ-cyclodextrin derivatives, δ-cyclodextrin, δ-cyclodextrin derivatives, zinc salts of C16-C18 fatty acids, and mixtures thereof.

The particles can comprise from about 0.1% to about 20% by weight of said particles malodor control agent, optionally from about 0.1% to about 15%, optionally from about 0.1% to about 12%, optionally from about 1% to about 15%, optionally from about 2% to about 20% by weight of said particles malodor control agent.

Anti-Caking Agent

An anti-caking agent can be provide to reduce the propensity for the particles to stick to one another after manufacture. The anti-caking agent can be applied to the exterior surface of the particles. The anti-caking agent can be a desiccant. The anti-caking agent can be selected from the group consisting of or selected from or selected from at least one of silica, zeolite, unmodified corn starch, cellulose, rock flour, clay, and combinations thereof. The anti-caking agent can be a stearates of calcium and magnesium, silica, silicates, talc, flour, starch. The anti-caking agent can be selected from the group consisting of or selected from or selected from at least one of tricalcium phosphate, powdered cellulose, magnesium stearate, sodium bicarbonate, sodium ferrocyanide, potassium ferrocyanide, calcium ferrocyanide, calcium phosphate, sodium silicate, silicon dioxide, calcium silicate, magnesium trisilicate, talcum powder, sodium aluminosilicate, potassium aluminum silicate, calcium aluminosilicate, bentonite, aluminum silicate, stearic acid, polydimethylsiloxane, and combinations thereof.

The particles can comprise from about 0.1% to about 10% by weight, optionally from about 0.1% to about 7%, optionally from about 0.5% to about 7%, optionally from about 0.1% to about 3%, optionally from about 0.1% to about 2%, by weight anti-caking agent.

Process for Treating Laundry

The process for treating laundry can comprise the steps of: providing an article of laundry in a washing machine; dispensing a fabric care composition comprising a plurality of particles into the washing machine; and contacting the article of laundry during a wash sub-cycle of the washing machine with the fabric care composition. The washing machine can have a wash sub-cycle and rinse sub-cycle. The particles of the fabric care composition can comprise: a fabric care active agent selected from the group consisting of or selected from or selected from at least one of perfume, fabric softener active, cationic polymer, dye transfer inhibitor, malodor control agent, and mixtures thereof; from 0% to 3% by weight of a plasticizer polyol that is liquid at 20 C and 1 atmosphere of pressure; from 1% to about 20% by weight water; from about 45% to about 80% by weight a sugar alcohol polyol selected from the group consisting of or selected from or selected from at least one of erythritol, xylitol, mannitol, isomalt, maltitol, lactitol, trehalose, lactose, tagatose, sucralose, and mixtures thereof; modified starch having a dextrose equivalent from 4 to 20, wherein the sugar alcohol polyol and the modified starch are present at a weight ratio of the sugar alcohol polyol to the modified starch from 2:1 to 16:1, optionally from 2:1 to 10:1, optionally from 2:1 to 3:1 if the modified starch has a dextrose equivalent from 15 to 20 and wherein the sugar alcohol polyol and the modified starch are present at a weight ratio of the sugar alcohol polyol to the modified starch from 1.5:1 to 16:1, optionally from 1.5:1 to 10:1, optionally from 1.5:1 to 4:1 if the modified starch has a dextrose equivalent from 4 to less than 15; wherein the fabric care active agent, the water, and the sugar alcohol polyol are dispersed in the modified starch. The fabric care active agent can be perfume and the particles can comprise from about 1% to about 20% by weight the perfume. The perfume can be a fragrance of plant origin.

The process for treating laundry can comprise the steps of: providing an article of laundry in a washing machine; dispensing a fabric care composition comprising a plurality of particles into the washing machine; and contacting the article of laundry during a wash sub-cycle of the washing machine with the fabric care composition. The washing machine can have a wash sub-cycle and rinse sub-cycle. The particles can be any of the particles disclosed herein. The fabric care active agent can be perfume and the particles can comprise from about 1% to about 20% by weight the perfume. The perfume can be a fragrance of plant origin.

The process for treating laundry can comprise the steps of: providing an article of laundry in a washing machine; dispensing a fabric care composition comprising a plurality of particles into the washing machine; and contacting the article of laundry during a wash sub-cycle of the washing machine with the fabric care composition. The washing machine can have a wash sub-cycle and rinse sub-cycle. The particles of the fabric care composition can comprise: a fabric care active agent selected from the group consisting of or selected from or selected from at least one of perfume, fabric softener active, cationic polymer, dye transfer inhibitor, malodor control agent, and mixtures thereof; from 0% to 3% by weight of a plasticizer polyol that is liquid at 20 C and 1 atmosphere of pressure; from 1% to about 10% by weight water; from about 15% to about 40% by weight a sugar alcohol polyol selected from the group consisting of or selected from or selected from at least one of erythritol, xylitol, mannitol, isomalt, maltitol, lactitol, trehalose, lactose, tagatose, sucralose, and mixtures thereof; modified starch having a dextrose equivalent from 4 to less than 15, wherein the sugar alcohol polyol and the modified starch are present at a weight ratio of the sugar alcohol polyol to the modified starch from 1:5 to 1:1, wherein the fabric care active agent, the water, and the sugar alcohol polyol are dispersed in the modified starch. The fabric care active agent can be perfume and the particles can comprise from about 1% to about 20% by weight the perfume. The perfume can be a fragrance of plant origin.

Process of Making Particles

The following is an example procedure for making particles by hand. Modified starch powder (for example maltodextrin powder), sugar alcohol polyol powder (for example mannitol powder), and water are weighed together into a glass beaker. Briefly mix with a spatula so that the powders absorb all the water. Making particles by hand can require more than the desirable amount of water due to the viscous nature of the powders at lower levels of water. When a high weight fraction of water is used, by way of nonlimiting example about 15% by weight of the particles, sometimes hours or even days are required for the particles to completely solidify in a mold.

The beaker and contents thereof are placed onto a hotplate and warmed until the mixture reaches a temperature of about 70 C to about 80 C. The contents of the beaker are mixed thoroughly until a homogenous melt (or viscous fluid) is obtained. At this point, the beaker and contents thereof are removed from the hotplate, and a measured quantity of neat perfume and or encapsulated perfume, or other fabric care active agent if provided, are added to the beaker and mixed with a spatula to obtain a homogenous mixture. The mixture, while still remaining a viscous melt, is poured onto a mold and spread evenly with a spatula across the mold. The molded particles are allowed to cool and dry overnight to solidify. Thorough drying and solidification can reduce the tackiness of the particles. Once the particles are sufficiently solid, the particles are collected from the mold and stored in a closed jar. If dusting with an anti-caking agent is desired, the desired quantity (by way of nonlimiting example about 1% to about 2% by weight of the particles) of anti-caking agent can be placed in the jar and distributed over the particles by closing the jar and gently shaking the jar to relatively evenly distribute the anti-caking agent over the particles.

The particles can also be made using an extrusion apparatus. This may be accomplished with a single screw extruder or a twin screw extruder. The following example is by use of a twin screw extruder. A PHARMA 11 twin-screw extruder available from THERMO FISHER SCIENTIFIC can be used.

The barrel of the extruder can be heated. The temperature may be varied across the zones of the extruder, for example to about 60 C at the beginning, where the powder maltodextrin and powder polyol are added, to about 80 C at a designated mixing zone, to about 50 C at the end of the extruder where product exits. The number of heating/cooling zones can vary, for example it can be 8 zones or 15 zones.

Powder maltodextrin and powder sugar alcohol polyol can be fed into the beginning of the extruder. The powders can be pre-mixed or added via separate feeds. Water is fed into a subsequent zone, preferably before a mixing zone. Fabric care active agents can be fed into the extruder barrel before or after the mixing zone, and can be targeted to a certain zone, for instance according to the flash point of the fabric care active and the temperature of the barrel, if the fabric care active agent is perfume. Perfume, or other fabric care active agent, can be added near the water feed before the first mixing zone. There may be one or more mixing zones in the extruder.

The powder feed and screw speed may be started at slower rates, and the water and perfume feeds at higher rates. This may prevent the extruder from shutting off due to high pressure at the mixing zones. As product exits the die, the powder feeds and screw speed rates can be increased and the water and perfume feed rates can be reduced to achieve a preferred product exiting the die (e.g. a soft solid to solid extrudate may be desired). The extrudate may be cooled for example on a cooling belt or air-cooling table. Once the extrudate is solid, it may be run through a cutter or chopper, to be cut into pellets or particles. These particles may be for example 4 mm in diameter (or larger, by way of nonlimiting example 8 mm), and may be cut to the desired height (e.g. about 3 to about 5 mm in height) by varying the speed that the extrudate is fed into the cutter and the rate at which the extrudate is cut. The cut pellets may be collected, and if desired they may be dusted with an anti-caking agent.

EXAMPLES

A series of specimens of particles were made to evaluate the stability of fabric care compositions described herein. The particles were made by hand or by an extruder, the methods of making particles using these methods are described previously.

Particles were tested for stability by storing in an open container in a constant temperature of 32 C and a constant relative humidity of 80%. The fabric care active agent included was perfume and encapsulated perfume. The unencapsulated perfume is the perfume used DOWNY UNSTOPABLES, FRESH, variant as of the filing date. The encapsulated perfume is the encapsulated perfume used in DOWNY UNSTOPABLES, FRESH, variant as of the filing date, and the weight fractions of encapsulated perfume listed in Tables 1 through 6 include the capsule wall material and other non-perfume minor materials that accompany the encapsulated perfume.

Compositions for specimens 1 to 8, made by hand, are listed in Table 1. Images of specimens 1 to 8 are shown in FIG. 1. The top row of FIG. 1 are the specimens before the stability test and are in a left to right order of specimens 1 to 8. The bottom row of FIG. 1 are the specimens after 24 hours of the stability test and are in left to right order of specimens 1 to 8. Each of compositions of specimens 1 to 8 was successfully made into particles. The particles of specimens 1 to 8 were sticky prior to being subjected to the stability test. The bottom row of FIG. 1 are the specimens after the stability test and are in a left to right order of specimens 1 to 8. The structure of each of the specimens degraded, with more structural degradation associated with the lower level of sugar alcohol polyol (36 wt %), as compared to specimens having the higher level of sugar alcohol polyol (46 wt %).

TABLE 1

Fabric care compositions, made by hand, comprising modified starch (maltodextrin M180), sugar alcohol polyol, water, unencapsulated perfume, and encapsulated perfume. Compositions are described as percent by weight (wt %).

| | | Specimen | | | | | | | |
|---|---|---|---|---|---|---|---|---|---|
| | | 1 | 2 | 3 | 4 | 5 | 6 | 7 | 8 |
| Modified | M180 | 37.1 | 27.1 | 37.1 | 27.1 | 37.1 | 27.1 | 37.1 | 27.1 |
| Starch, | M100 | — | — | — | — | — | — | — | — |
| Maltodextrins | M040 | — | — | — | — | — | — | — | — |
| Sugar Alcohol | Mannitol | 36.4 | 46.4 | — | — | — | — | — | — |
| Polyol | Maltitol | — | — | 36.4 | 46.4 | — | — | — | — |
| | Erythritol | — | — | — | — | 36.4 | 46.4 | — | — |
| | Isomalt | — | — | — | — | — | — | 36.4 | 46.4 |
| | Sorbitol | — | — | — | — | — | — | — | — |

TABLE 1-continued

Fabric care compositions, made by hand, comprising modified starch (maltodextrin M180), sugar alcohol polyol, water, unencapsulated perfume, and encapsulated perfume. Compositions are described as percent by weight (wt %).

| | | Specimen | | | | | | | |
|---|---|---|---|---|---|---|---|---|---|
| | | 1 | 2 | 3 | 4 | 5 | 6 | 7 | 8 |
| Water | | 17.3 | 17.3 | 17.3 | 17.3 | 17.3 | 17.3 | 17.3 | 17.3 |
| Perfume | Encapsulated | 1.7 | 1.7 | 1.7 | 1.7 | 1.7 | 1.7 | 1.7 | 1.7 |
| | Unencapsulated | 7.5 | 7.5 | 7.5 | 7.5 | 7.5 | 7.5 | 7.5 | 7.5 |
| | Total | 100 | 100 | 100 | 100 | 100 | 100 | 100 | 100 |

Figure 2:
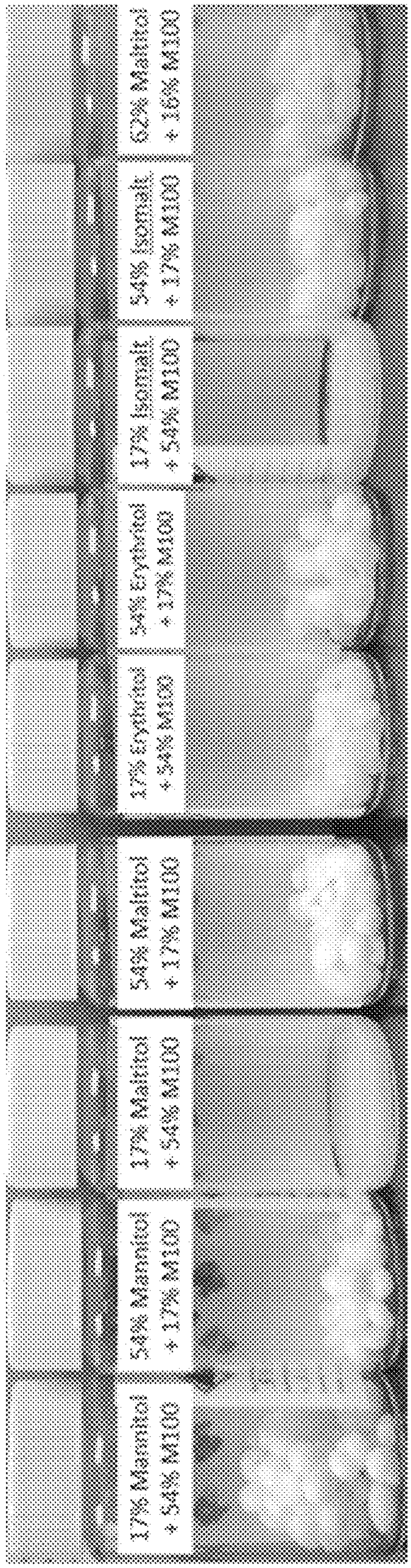
FIG. 2 is an image of particles of specimens 9 to 17 after the stability test.

Compositions for specimens 9 to 17, made by hand, are listed in Table 2. Images of specimens 9 to 17 after 2 weeks of the stability test are shown in FIG. 2. The specimens are in left to right order of specimens 9 to 17. Each of compositions of specimens 9 to 17 was successfully made into particles. For specimens 9 to 17, specimens having 17 wt % sugar alcohol polyol had inadequate structural stability after 2 weeks of the stability test. The particles of specimens 9 and 13 clumped to one another. The particles of specimens 11 and 15 collapsed into a substantially liquid state. The particles of specimens 10, 12, 14, 16, and 17, which had 54 wt % sugar alcohol polyol except for specimen 17, which had 62 wt % sugar alcohol polyol, retained their particulate form and were not too sticky after 2 weeks of the stability test.

TABLE 2

Fabric care compositions, made by hand, comprising modified starch (maltodextrin M100), sugar alcohol polyol, water, unencapsulated perfume, and encapsulated perfume. Compositions are described as percent by weight (wt %)

| | | Specimen | | | | | | | | |
|---|---|---|---|---|---|---|---|---|---|---|
| | | 9 | 10 | 11 | 12 | 13 | 14 | 15 | 16 | 17 |
| Modified | M180 | — | — | — | — | — | — | — | — | — |
| Starch, | M100 | 53.8 | 17 | 53.8 | 17 | 53.8 | 17 | 53.8 | 17 | 16.3 |
| Maltodextrins | M040 | — | — | — | — | — | — | — | — | — |
| Sugar Alcohol | Mannitol | 17 | 53.8 | — | — | — | — | — | — | — |
| Polyol | Maltitol | — | — | 17 | 53.8 | — | — | — | — | 62.3 |
| | | | | | | | | | | — |
| | Erythritol | — | — | — | — | 17 | 53.8 | — | — | — |
| | Isomalt | — | — | — | — | — | — | 17 | 53.8 | — |
| | Sorbitol | — | — | — | — | — | — | — | — | — |
| Water | | 17.3 | 17.3 | 17.3 | 17.3 | 17.3 | 17.3 | 17.3 | 17.3 | 9.8 |
| Perfume | Encapsulated | 1.6 | 1.6 | 1.6 | 1.6 | 1.6 | 1.6 | 1.6 | 1.6 | 1.6 |
| | Unencapsulated | 10.3 | 10.3 | 10.3 | 10.3 | 10.3 | 10.3 | 10.3 | 10.3 | 10 |
| | Total | 100 | 100 | 100 | 100 | 100 | 100 | 100 | 100 | 100 |
| Stable after 2 Weeks of Stability Test? | | No | Yes | No | Yes | No | Yes | No | Yes | Yes |

Figure 3:
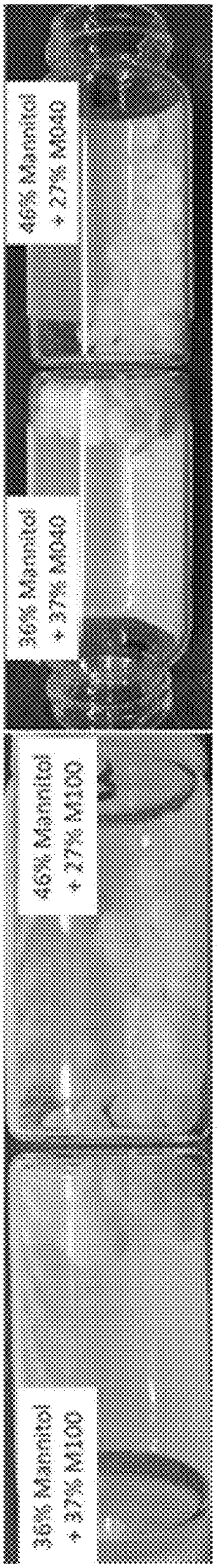
FIG. 3 is an image of particles of specimens 18 to 21 after the stability test.

Compositions for specimens 18 to 21, made by hand, are listed in Table 3. Images of specimens 18 to 21 after 2 weeks of the stability test are shown in FIG. 3. The specimens are in left to right order of specimens 18 to 21. Specimens 18 to 21 each required several hours to dry to form a particle. The images of the in FIG. 3 are the containers tipped on their sides after the stability tests. Particles of specimens 18 and 20 remained in a clump at the bottom of the container, which is an indicator of instability of the particles. Particles of specimens 19 and 21 remained flowable, which is an indicator of stability of the particles. Specimens 19 and 21 had 46 wt % of polyol (mannitol) compared to 36 wt % for specimens 18 and 20.

TABLE 3

Fabric care compositions, made by hand, comprising modified starch, sugar alcohol polyol (mannitol), water, unencapsulated perfume, and encapsulated perfume. Compositions are described as percent by weight (wt %).

| | | Specimen | | | |
|---|---|---|---|---|---|
| | | 18 | 19 | 20 | 21 |
| Modified | M180 | — | — | — | — |
| Starch, | M100 | 37.1 | 27.1 | — | — |
| Maltodextrins | M040 | — | — | 37.1 | 27.1 |
| Sugar Alcohol | Mannitol | 36.4 | 46.4 | 36.4 | 46.4 |
| Polyol | Maltitol | — | — | — | — |
| | Erythritol | — | — | — | — |
| | Isomalt | — | — | — | — |
| | Sorbitol | — | — | — | — |
| Water | | 19.35 | 19.35 | 19.35 | 19.35 |
| Perfume | Encapsulated | 3.15 | 3.15 | 3.15 | 3.15 |
| | Unencapsulated | 4 | 4 | 4 | 4 |
| | TOTAL | 100 | 100 | 100 | 100 |
| Stable after 2 Weeks of Stability Test? | | No | Yes | No | Yes |

Compositions for specimens 22 to 29 are listed in Table 4. Specimen 22 was made by extrusion and had 1 wt % corn starch dusting and the particles did not stick to one another. Particles of specimen 23 was made by hand, required a long drying time. Specimen 24 was made by extrusion but particles were sticky after 24 hours of the stability test, even though they were dusted with 1 wt % corn starch. Particles of specimen 25 were made by hand and were stable after 24 hours of the stability test but dissolved slowly in water and were not stable after 2 weeks of the stability test. Particles of specimen 26 did not have a sugar alcohol polyol and were made by hand. Particles of specimen 27 were made by hand but the particles were too sticky to be removed from the mold. Particles of specimen 28 were made by hand. Particles of specimen 28 required multiple days to dry. Particles of specimen 29 were made by hand but took 3 days to dry.

TABLE 4

Fabric care compositions comprising modified starch, sugar alcohol polyol (mannitol), water, unencapsulated perfume, and encapsulated perfume. Compositions are described as percent by weight (wt %).

| | | Specimen | | | | | | | |
|---|---|---|---|---|---|---|---|---|---|
| | | 22 | 23 | 24 | 25 | 26 | 27 | 28 | 29 |
| Modified | M180 | — | 17 | — | — | — | 20 | 26 | 71 |
| Starch, | M100 | 60.1 | — | — | — | — | — | — | — |
| Maltodextrins | M040 | — | — | 70.2 | 60 | 73 | — | — | — |
| Sugar Alcohol | Mannitol | 21 | 45 | 14.1 | 10 | — | 34 | 46 | — |
| Polyol | Maltitol | — | — | — | — | — | — | — | — |
| | Erythritol | — | — | — | — | — | — | — | — |
| | Isomalt | — | — | — | — | — | — | — | — |
| | Sorbitol | — | — | — | — | — | 25 | — | — |
| Water | | 6.5 | 27.7 | 7.6 | 19.8 | 17.3 | 11 | 18 | 20.3 |
| Perfume | Encapsulated | 1.7 | 1.8 | 2.0 | 1.7 | 1.7 | — | — | 1.7 |
| | Unencapsulated | 10.5 | 8.5 | 6.1 | 8.5 | 8 | 10 | 10 | 7 |
| | TOTAL | 100 | 100 | 100 | 100 | 100 | 100 | 100 | 100 |
| Stable after 24 Hours of Stability Test? | | Yes | Yes | No | Yes | No | No | Yes | No |

Compositions for specimens 30 to 35 are listed in Table 5. Particles of specimens 30 and 31 were made by hand and were sticky after one week of drying at room temperature. Particles of specimen 30 could not be removed from the mold. Particles of specimen 32 could not be made by hand since the composition had the consistency of a powder. Particles of specimen 33 were made by hand and required multiple days to dry in the mold and were sticky. Particles of specimen 34 could not be made by hand since the composition had the consistency of a powder. Particles of specimen 35 were made by hand and required multiple days to dry in the mold and were sticky.

TABLE 5

Fabric care compositions comprising modified starch, sugar alcohol polyol, unencapsulated perfume, and encapsulated perfume. Compositions are described as percent by weight (wt %).

| | | Specimen | | | | | |
|---|---|---|---|---|---|---|---|
| | | 30 | 31 | 32 | 33 | 34 | 35 |
| Modified Starch, Maltodextrins | M180 | — | — | 40 | — | 26 | 20 |
| | M100 | 37.1 | 27.1 | — | 37.1 | — | — |
| | M040 | — | — | — | — | — | — |
| Sugar Alcohol Polyol | Mannitol | — | — | 51 | 36.4 | — | — |
| | Maltitol | — | — | — | — | 65 | 64 |
| | Erythritol | — | — | — | — | — | — |
| | Isomalt | — | — | — | — | — | — |
| | Sorbitol | 36.4 | 46.4 | — | — | — | — |
| Water | | 19.35 | 19.35 | — | 4.35 | — | 4.35 |
| Plasticizer Polyol, Glycerin | | — | — | — | 15 | — | 4.5 |
| Perfume | Encapsulated | 3.15 | 3.15 | — | 3.15 | — | 3.15 |
| | Unencapsulated | 4 | 4 | 9 | 4 | 9 | 4 |
| | TOTAL | 100 | 100 | 100 | 100 | 100 | 100 |
| Stable after 24 Hours of Stability Test? | | — | No | — | No | — | No |

Compositions for specimens 36 to 41 are listed in Table 6. Particles of specimens 36 to 38 were powdery. Particles of specimens 39 to 41 were difficult to make by hand. Particles of specimens 36 to 38 did not include water.

TABLE 6

Fabric care compositions comprising modified starch, sugar alcohol polyol (mannitol), unencapsulated perfume, and encapsulated perfume. Compositions are described as percent by weight (wt %).

| | | Specimen | | | | | |
|---|---|---|---|---|---|---|---|
| | | 36 | 37 | 38 | 39 | 40 | 41 |
| Modified Starch, Maltodextrins | M180 | — | — | — | — | — | — |
| | M100 | 25 | 25 | 25 | 25 | 25 | 25 |
| | M040 | — | — | — | — | — | — |
| Sugar Alcohol Polyol | Mannitol | 58 | 58 | 58 | 58.3 | 58.3 | 58.3 |
| | Maltitol | — | — | — | — | — | — |
| | Erythritol | — | — | — | — | — | — |
| | Isomalt | — | — | — | — | — | — |
| | Sorbitol | — | — | — | — | — | — |
| Water | | — | — | — | 5.6 | 5.6 | 5.6 |
| Plasticizer Polyol, Propylene Glycol | | 8 | — | — | 3 | — | — |
| Plasticizer Polyol, Dipropylene Glycol | | — | — | 8 | — | — | 3 |
| Plasticizer Polyol, Glycerin | | — | 8 | — | — | 3 | — |

TABLE 6-continued

Fabric care compositions comprising modified starch, sugar alcohol polyol (mannitol), unencapsulated perfume, and encapsulated perfume. Compositions are described as percent by weight (wt %).

| | | Specimen | | | | | |
|---|---|---|---|---|---|---|---|
| | | 36 | 37 | 38 | 39 | 40 | 41 |
| Perfume | Encapsulated | — | — | — | 4.1 | 4.1 | 4.1 |
| | Unencapsulated | 9 | 9 | 9 | 4 | 4 | 4 |
| | TOTAL | 100 | 100 | 100 | 100 | 100 | 100 |
| Stable after 24 Hours of Stability Test? | | No | No | No | Yes | Yes | Yes |

Combinations

An example is below:

A. A fabric care composition comprising a plurality of particles, wherein said particles comprise:

a fabric care active agent selected from the group consisting of or selected from or selected from at least one of perfume, fabric softener active, cationic polymer, dye transfer inhibitor, malodor control agent, and mixtures thereof;

from 0% to 3% by weight plasticizer polyol, wherein said plasticizer polymer is optionally a liquid at 20 C and 1 atmosphere of pressure;

from 1% to about 20%, preferably 1% to about 12%, even more preferably about 6% to about 8%, by weight water;

from about 45% to about 80%, preferably about 50% to about 70%, preferably about 50% to about 60%, by weight sugar alcohol polyol selected from the group consisting of or selected from or selected from at least one of erythritol, xylitol, mannitol, isomalt, maltitol, lactitol, trehalose, lactose, tagatose, sucralose, and mixtures thereof;

wherein said particles further comprise:

a. modified starch having a dextrose equivalent from 15 to 20 and said sugar alcohol polyol and said modified starch are present at a weight ratio of said sugar alcohol polyol to said modified starch from 2:1 to 16:1, preferably from 2:1 to 10:1, more preferably from 2:1 to 3:1; or b. modified starch having a dextrose equivalent from 4 to less than 15 and said sugar alcohol polyol and said modified starch are present at a weight ratio of said sugar alcohol polyol to said modified starch from 1.5:1 to 16:1, preferably from 1.5:1 to 10:1, more preferably from 1.5:1 to 4:1;

wherein said fabric care active agent, said water, and said sugar alcohol polyol are dispersed in said modified starch.

B. The fabric care composition according to Paragraph A, wherein said particles comprise modified starch having a dextrose equivalent from 15 to 20 and said sugar alcohol polyol and said modified starch are present at a ratio from 2:1 to 16:1, preferably from 2:1 to 10:1, more preferably from 2:1 to 3:1.

C. The fabric care composition according to Paragraph A, modified starch having a dextrose equivalent from 4 to less than 15 and said sugar alcohol polyol and said modified starch are present at a weight ratio of said sugar alcohol polyol to said modified starch from 1.5:1 to 16:1, preferably from 1.5:1 to 10:1, more preferably from 1.5:1 to 4:1.

D. The fabric care composition according to Paragraph C, wherein said modified starch has a dextrose equivalent from 4 to 12.

E. The fabric care composition according to any of Paragraphs A to D, wherein said fabric care active agent is perfume, wherein said perfume is unencapsulated perfume or encapsulated perfume.

F. The fabric care composition according to Paragraph E, wherein said particles comprise from about 1% to about 20% by weight said perfume.

G. The fabric care composition according to Paragraph F, wherein said perfume is a fragrance of plant origin.

H. The fabric care composition according to Paragraph G, wherein said fragrance of plant origin is selected from the group consisting of or selected from or selected from at least one of almond oil, ambrette, angelica seeds oil, armoise oil, basil oil grand vert, benzoin resinoid, bergamot essential oil, bergamot oil, black pepper oil, black pepper essence, black currant essence, blood orange oil, bois des landes, brandy pure jungle essence, cade, camomille romaine he, cardamom guat extract, cardamom oil, carrot heart, caryophyllene extra, cedar, cedarleaf, cedarwood oil, cinnamon bark ceylon, cinnamon ceylan extract, beeswax, citronella, citronellal, clary sage essential oil, clove leaf oil rectified, copaiba balsam, coriander, cos cos anethol, cos cos essence coriandre russie, cucumber extract, cumin oil, cypriol heart, elemi coeur, elemi oil, english white camomile, eucalyptol, *Eucalyptus citriodora*, eugenol, galbanum heart, ginger, grapefruit replacer, guaiacwood oil, gurjum oil, healingwood blo, helichrysum, iso eugenol, jasmine sambac, juniper berry oil, key lime, labdanum resinoid, lavandin abrialis oil, lavandin grosso, lavender essential oil, lemon cedrat, lemon oil, lemon peel verdelli, lemongrass, lemongrass oil, *Litsea cubeba*, magnolia flower oil, mandarin oil yellow, menthol cristalisé, mint piperita cascade, narcisse, neroli oil, nutmeg, orange flower water, orange oil, orange phase oil, organic rose water, osmanthus, patchouli, patchouli heart, patchouli oil, pepper black oil, peppermint, peru balsam absolute, petitgrain t'less, pimento berry oil, pink pepper, raspberry essence, rhodinol, rose, rose centifolia, sandalwood, sichuan pepper extract, styrax white, sweet orange oil, tangerine oil, vanilla, vetiver, violet leaves, violette feuilles, wormwood oil, and combinations thereof.

I. The fabric care composition according to any of Paragraphs A to D, wherein said fabric care active agent is cationic polymer, wherein said cationic polymer is cationic polysaccharide.

J. The fabric care composition according to Paragraph I, wherein said cationic polysaccharide is polymeric quaternary ammonium salt of hydroxyethylcellulose which has been reacted with an epoxide substituted with a trimethylammonium group.

K. The fabric care composition according to any of Paragraphs A to D, wherein said fabric care active agent is fabric softener active, wherein said fabric softener active is a quaternary ammonium compound formed from a parent fatty acid compound having an Iodine Value from about 18 to about 60.

L. The fabric care composition according to any of Paragraphs A to K, wherein said modified starch is maltodextrin.

M. The fabric care composition according to any of Paragraphs A to L, wherein said sugar alcohol polyol is mannitol.

N. The fabric care composition according to any of Paragraphs A to M, wherein said particles each have an exterior surface and an anti-caking agent is on said exterior surface.

O. The fabric care composition according to any of Paragraphs A to N, wherein said fabric care active agent is plant derived.

P. The fabric care composition according to any of Paragraphs A to O, wherein said plasticizer polyol is selected from the group consisting of or selected from or selected from at least one of glycerin, dipropylene glycol, propylene glycol, and mixtures thereof.

Q. The fabric care composition according to any of Paragraphs A to P, wherein said composition comprises less than 10% by weight particles having an individual mass less than about 10 mg.

R. A process for treating laundry comprising the steps of:

providing an article of laundry in a washing machine;

dispensing said fabric care composition according to any of Paragraphs A to Q into said washing machine; and contacting said article of laundry during a wash subcycle of said washing machine with said fabric care composition.

S. A fabric care composition comprising a plurality of particles, wherein said particles comprise:

a fabric care active agent selected from the group consisting of or selected from or selected from at least one of perfume, fabric softener active, cationic polymer, malodor control agent, and mixtures thereof;

from 0% to 3% by weight plasticizer polyol that is liquid at 20 C and 1 atmosphere of pressure;

from 1% to about 10%, preferably from about 3% to about 8%, by weight water;

from about 15% to about 40%, preferably from about 20% to about 30%, by weight sugar alcohol polyol selected from the group consisting of or selected from or selected from at least one of erythritol, xylitol, mannitol, isomalt, maltitol, lactitol, trehalose, lactose, tagatose, sucralose, and mixtures thereof; and modified starch having a dextrose equivalent from 4 to less than 15 and said sugar alcohol polyol and said modified starch are present at a weight ratio of said sugar alcohol polyol to said modified starch from 1:5 to 1:1;

wherein said fabric care active agent, said water, and said sugar alcohol polyol are dispersed in said modified starch; and wherein said particles each have an exterior surface and an anti-caking agent is on said exterior surface.

T. The fabric care composition according to Paragraph S, wherein said fabric care active agent is perfume, wherein said perfume is unencapsulated perfume or encapsulated perfume.

U. The fabric care composition according to Paragraph T, wherein said particles comprise from about 1% to about 20%, preferably about 3% to about 15%, by weight said perfume.

V. The fabric care composition according to Paragraph T, wherein said perfume is a fragrance of plant origin.

W. The fabric care composition according to Paragraph V, wherein said fragrance of plant origin is selected from the group consisting of or selected from or selected from at least one of almond oil, ambrette, angelica seeds oil, armoise oil, basil oil grand vert, benzoin resinoid, bergamot essential oil, bergamot oil, black pepper oil, black pepper essence, black currant essence, blood orange oil, bois des landes, brandy pure jungle essence, cade, camomille romaine he, cardamom guat extract, cardamom oil, carrot heart, caryophyllene extra, cedar, cedarleaf, cedarwood oil, cinnamon bark ceylon, cinnamon ceylan extract, beeswax, citronella, citronellal, clary sage essential oil, clove leaf oil rectified, copaiba balsam, coriander, cos cos anethol, cos cos essence coriandre russie, cucumber extract, cumin oil, cypriol heart, elemi coeur, elemi oil, english white camomile, eucalyptol, *Eucalyptus citriodora*, eugenol, galbanum heart, ginger, grapefruit replacer, guaiacwood oil, gurjum oil, healingwood blo, helichrysum, iso eugenol, jasmine sambac, juniper berry oil, key lime, labdanum resinoid, lavandin abrialis oil, lavandin grosso, lavender essential oil, lemon cedrat, lemon oil, lemon peel verdelli, lemongrass, lemongrass oil, *Litsea cubeba*, magnolia flower oil, mandarin oil yellow, menthol cristalisé, mint piperita cascade, narcisse, neroli oil, nutmeg, orange flower water, orange oil, orange phase oil, organic rose water, osmanthus, patchouli, patchouli heart, patchouli oil, pepper black oil, peppermint, peru balsam absolute, petitgrain t'less, pimento berry oil, pink pepper, raspberry essence, rhodinol, rose, rose centifolia, sandalwood, sichuan pepper extract, styrax white, sweet orange oil, tangerine oil, vanilla, vetiver, violet leaves, violette feuilles, wormwood oil, and combinations thereof.

X. The fabric care composition according to any of Paragraphs S to W, wherein said plasticizer polyol is selected from the group consisting of or selected from or selected from at least one of glycerin, dipropylene glycol, propylene glycol, and mixtures thereof.

Y. The fabric care composition according to any of Paragraphs S to X, wherein said composition comprises less than 10% by weight particles having an individual mass less than about 10 mg.

Z. A process for treating laundry comprising the steps of:

providing an article of laundry in a washing machine;

dispensing said fabric care composition according to any of Paragraphs S to X into said washing machine;

contacting said article of laundry during a wash sub-cycle of said washing machine with said fabric care composition.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. A fabric care composition comprising a plurality of particles, wherein said particles comprise:

a fabric care active agent selected from perfume, fabric softener active, cationic polymer, malodor control agent, and mixtures thereof;

from 0% to 3% by weight plasticizer polyol that is liquid at 20° C. and 1 atmosphere of pressure;

from 1% to about 10% by weight water;

from about 15% to about 40% by weight sugar alcohol polyol selected from maltitol, lactitol, trehalose, tagatose, sucralose, and mixtures thereof; and modified starch having a dextrose equivalent from 4 to less than 15 and said sugar alcohol polyol and said modified starch are present at a weight ratio of said sugar alcohol polyol to said modified starch from 1:5 to 1:1;

wherein said fabric care active agent, said water, and said sugar alcohol polyol are dispersed in said modified starch.

2. A process for treating laundry comprising the steps of:

providing an article of laundry in a washing machine;

dispensing said fabric care composition according to claim 1 into said washing machine; and contacting said article of laundry during a wash sub-cycle of said washing machine with said fabric care composition.

3. The fabric care composition according to claim 1, wherein said fabric care active agent is perfume, wherein said perfume is unencapsulated perfume or encapsulated perfume.

4. The fabric care composition according to claim 3, wherein said particles comprise from about 1% to about 20% by weight said perfume.

5. A process for treating laundry comprising the steps of:

providing an article of laundry in a washing machine;

dispensing said fabric care composition according to claim 4 into said washing machine; and contacting said article of laundry during a wash sub-cycle of said washing machine with said fabric care composition.

6. The fabric care composition according to claim 4, wherein said particles each have an exterior surface and an anti caking agent is on said exterior surface.

7. The fabric care composition according to claim 4, wherein said perfume is a fragrance of plant origin.

8. A process for treating laundry comprising the steps of:
providing an article of laundry in a washing machine;
dispensing said fabric care composition according to claim 7 into said washing machine; and
contacting said article of laundry during a wash sub-cycle of said washing machine with said fabric care composition.

9. The fabric care composition according to claim 7, wherein said particles each have an exterior surface and an anti caking agent is on said exterior surface.

10. The fabric care composition according to claim 9, wherein said fragrance of plant origin is selected from almond oil, ambrette, angelica seeds oil, armoise oil, basil oil grand vert, benzoin resinoid, bergamot essential oil, bergamot oil, black pepper oil, black pepper essence, black currant essence, blood orange oil, bois des landes, brandy pure jungle essence, cade, camomille romaine he, cardamom guat extract, cardamom oil, carrot heart, caryophyllene extra, cedar, cedarleaf, cedarwood oil, cinnamon bark ceylon, cinnamon ceylan extract, beeswax, citronella, citronellal, clary sage essential oil, clove leaf oil rectified, copaiba balsam, coriander, cos cos anethol, cos cos essence coriandre russie, cucumber extract, cumin oil, cypriol heart, elemi coeur, elemi oil, english white camomile, eucalyptol, *Eucalyptus citriodora*, eugenol, galbanum heart, ginger, grapefruit replacer, guaiacwood oil, gurjum oil, healingwood blo, helichrysum, iso eugenol, jasmine sambac, juniper berry oil, key lime, labdanum resinoid, lavandin abrialis oil, lavandin grosso, lavender essential oil, lemon cedrat, lemon oil, lemon peel verdelli, lemongrass, lemongrass oil, *Litsea cubeba*, magnolia flower oil, mandarin oil yellow, menthol cristalisé, mint piperita cascade, narcisse, neroli oil, nutmeg, orange flower water, orange oil, orange phase oil, organic rose water, osmanthus, patchouli, patchouli heart, patchouli oil, pepper black oil, peppermint, peru balsam absolute, petitgrain t'less, pimento berry oil, pink pepper, raspberry essence, rhodinol, rose, rose centifolia, sandalwood, sichuan pepper extract, styrax white, sweet orange oil, tangerine oil, vanilla, vetiver, violet leaves, violette feuilles, wormwood oil, and combinations thereof.

11. A process for treating laundry comprising the steps of:
providing an article of laundry in a washing machine;
dispensing said fabric care composition according to claim 10 into said washing machine; and
contacting said article of laundry during a wash sub-cycle of said washing machine with said fabric care composition.

12. The fabric care composition according to claim 1, wherein said modified starch is maltodextrin.

13. A process for treating laundry comprising the steps of:
providing an article of laundry in a washing machine;
dispensing said fabric care composition according to claim 12 into said washing machine;
and
contacting said article of laundry during a wash sub-cycle of said washing machine with said fabric care composition.

14. The fabric care composition according to claim 1, wherein said plasticizer polyol is selected from glycerin, dipropylene glycol, propylene glycol, and mixtures thereof.

15. The fabric care composition according to claim 14, wherein said particles each have an exterior surface and an anti caking agent is on said exterior surface.

* * * * *